(12) United States Patent
Sarkar et al.

(10) Patent No.: US 12,360,361 B2
(45) Date of Patent: *Jul. 15, 2025

(54) ADVANCED PACKAGING FOR COMPACT OBJECT-SCANNING MODULES

(71) Applicant: AdHawk Microsystems Inc., Waterloo (CA)

(72) Inventors: Niladri Sarkar, Waterloo (CA); Dong Yan, North York (CA); Geoffrey Lee, Kitchener (CA); Arash Rohani, Waterloo (CA); Nino Zahirovic, Waterloo (CA); Duncan Wesley Strathearn, Waterloo (CA); John Domm, Kitchener (CA); Zhenhao Li, Waterloo (CA); Gregory A. Magel, Dallas, TX (US)

(73) Assignee: AdHawk Microsystems Inc., Waterloo (CA)

( * ) Notice: Subject to any disclaimer, the term of this patent is extended or adjusted under 35 U.S.C. 154(b) by 729 days.

This patent is subject to a terminal disclaimer.

(21) Appl. No.: 17/681,503

(22) Filed: Feb. 25, 2022

(65) Prior Publication Data

US 2022/0252868 A1 Aug. 11, 2022

Related U.S. Application Data

(63) Continuation-in-part of application No. 16/232,410, filed on Dec. 26, 2018, now Pat. No. 11,262,577.

(60) Provisional application No. 62/610,493, filed on Dec. 26, 2017.

(51) Int. Cl.
*G02B 26/10* (2006.01)
*G02B 26/08* (2006.01)

(52) U.S. Cl.
CPC ....... *G02B 26/101* (2013.01); *G02B 26/0833* (2013.01); *G02B 26/0875* (2013.01)

(58) Field of Classification Search
CPC .............. G02B 26/101; G02B 26/0833; G02B 26/0875; G02B 26/106
See application file for complete search history.

(56) References Cited

U.S. PATENT DOCUMENTS

| | | | |
|---|---|---|---|
| 5,638,176 A | 6/1997 | Hobbs et al. | |
| 7,388,699 B1 | 6/2008 | Coffee | |
| 10,824,229 B2 | 11/2020 | Sarkar | |
| 11,262,577 B2 * | 3/2022 | Sarkar | G02B 27/425 |

(Continued)

OTHER PUBLICATIONS

Notice of Allowance and Fees Due (PTOL-85) Mailed on Oct. 19, 2022 for U.S. Appl. No. 17/673,337.

(Continued)

*Primary Examiner* — James C. Jones
(74) *Attorney, Agent, or Firm* — Kaplan Breyer Schwarz, LLP

(57) ABSTRACT

The present disclosure is directed to compact packaging for optical MEMS devices, such as one- and two-dimensional light scanners. An embodiment in accordance with the present disclosure includes a housing having a chamber for holding a light source and a MEMS scanner. The MEMS scanner receives light from the light source via an optical element disposed on a cover of the housing and steers an output signal along a propagation direction through the cover while steering the output signal in at least one dimension.

35 Claims, 14 Drawing Sheets

(56) References Cited

U.S. PATENT DOCUMENTS

| | | |
|---|---|---|
| 2002/0014579 A1 | 2/2002 | Dunfield |
| 2004/0061831 A1 | 4/2004 | Aughey et al. |
| 2004/0120023 A1 | 6/2004 | Bush et al. |
| 2007/0001248 A1 | 1/2007 | Geisberger et al. |
| 2007/0081241 A1 | 4/2007 | Hayashi |
| 2008/0266818 A1 | 10/2008 | Collet et al. |
| 2009/0062658 A1 | 3/2009 | Dunki-Jacobs et al. |
| 2013/0242364 A1 | 9/2013 | Kilcher et al. |
| 2015/0047078 A1 | 2/2015 | Sarkar et al. |
| 2015/0235355 A1 | 8/2015 | Mullins |
| 2016/0029883 A1 | 2/2016 | Cox |
| 2016/0166146 A1 | 6/2016 | Sarkar |
| 2016/0240013 A1 | 8/2016 | Spitzer |
| 2017/0038253 A1 | 2/2017 | Mallinson |
| 2017/0067609 A1 | 3/2017 | Ichikawa et al. |
| 2017/0115483 A1 | 4/2017 | Aleem et al. |
| 2017/0123489 A1 | 5/2017 | Guenter |
| 2017/0364732 A1 | 12/2017 | Komogortsev |
| 2018/0189977 A1 | 7/2018 | Zecchini et al. |
| 2018/0210547 A1 | 7/2018 | Sarkar |
| 2019/0120940 A1 | 4/2019 | Pei et al. |
| 2019/0204913 A1 | 7/2019 | Sarkar et al. |
| 2022/0261074 A1 | 8/2022 | Zahirovic et al. |

OTHER PUBLICATIONS

Notice of Allowance received for U.S. Appl. No. 17/673,337, mailed on Oct. 27, 2022, 2 pages.

Final Rejection Mailed on Jun. 15, 2020 for U.S. Appl. No. 15/876,148.

Final Rejection received for U.S. Appl. No. 15/876,148, mailed on Aug. 23, 2019, 11 pages.

Non-Final Office Action received for U.S. Appl. No. 15/876,148, mailed on Feb. 24, 2020, 15 pages.

Non-Final Rejection Mailed on Jan. 7, 2022 for U.S. Appl. No. 17/143,048.

Non-Final Rejection Mailed on Jun Jun. 18, 2020 for U.S. Appl. No. 16/236,993.

Non-Final Rejection Mailed on Oct. 27, 2020 for U.S. Appl. No. 16/234,293.

Non-Final Rejection Mailed on Sep. 3, 2021 for U.S. Appl. No. 17/087,302.

Non-Final Rejection received for U.S. Appl. No. 15/876,148, mailed on May 3, 2019, 9 pages.

Notice of Allowance and Fees Due (PTOL-85) Mailed on Jul. 16, 2020 for U.S. Appl. No. 15/876,148.

Notice of Allowance and Fees Due (PTOL-85) Mailed on Mar. 5, 2021 for U.S. Appl. No. 16/234,293.

Notice of Allowance and Fees Due (PTOL-85) Mailed on Oct. 7, 2020 for U.S. Appl. No. 16/236,993.

Non-Final Rejection Mailed on Apr. 29, 2021 for U.S. Appl. No. 16/232,410.

Notice of Allowance Mailed on Oct. 20, 2021 for U.S. Appl. No. 16/232,410.

Zhaoyi Li et al., "Meta-Optics achieves RGB-achromatic focusing for virtual reality," Science Advances, vol. 7, No. 5, Jan. 27, 2021, (www.doi.org/10.1126/sciadv.abe4458), 8 pp.

Jacob Engelberg et al., "The Advantages of metalenses over diffractive lenses," "Nature Communications", vol. 11, dated 2020, (https://doi.org/10.1038/s41467-020-15972-9), 4 pp.

Non-Final Rejection Mailed on May 8, 2023 for U.S. Appl. No. 18/098,899, 13 page(s).

Notice of Allowance and Fees Due (PTOL-85) Mailed on Jul. 10, 2023 for U.S. Appl. No. 18/098,899, 6 page(s).

Notice of Allowance and Fees Due (PTOL-85) Mailed on May 18, 2022 for U.S. Appl. No. 17/143,048.

Notice of Allowance and Fees Due (PTOL-85) Mailed on Mar. 23, 2022 for U.S. Appl. No. 17/087,302.

\* cited by examiner

Light Scanner 100

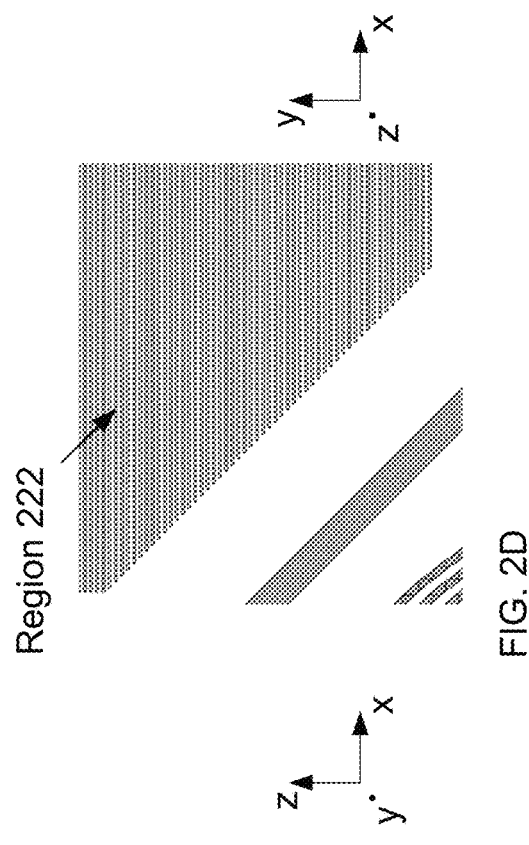
FIG. 2C
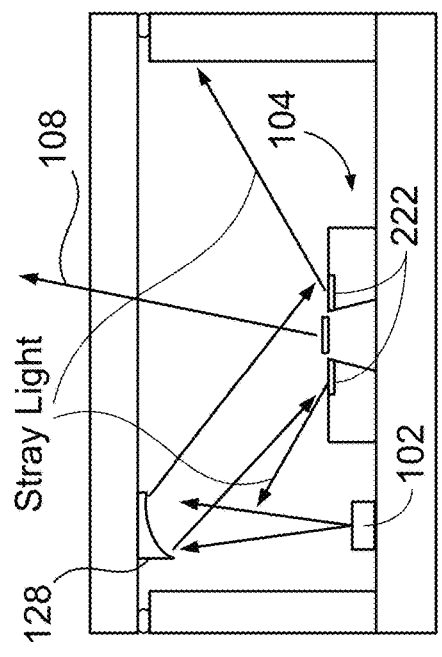
FIG. 2D
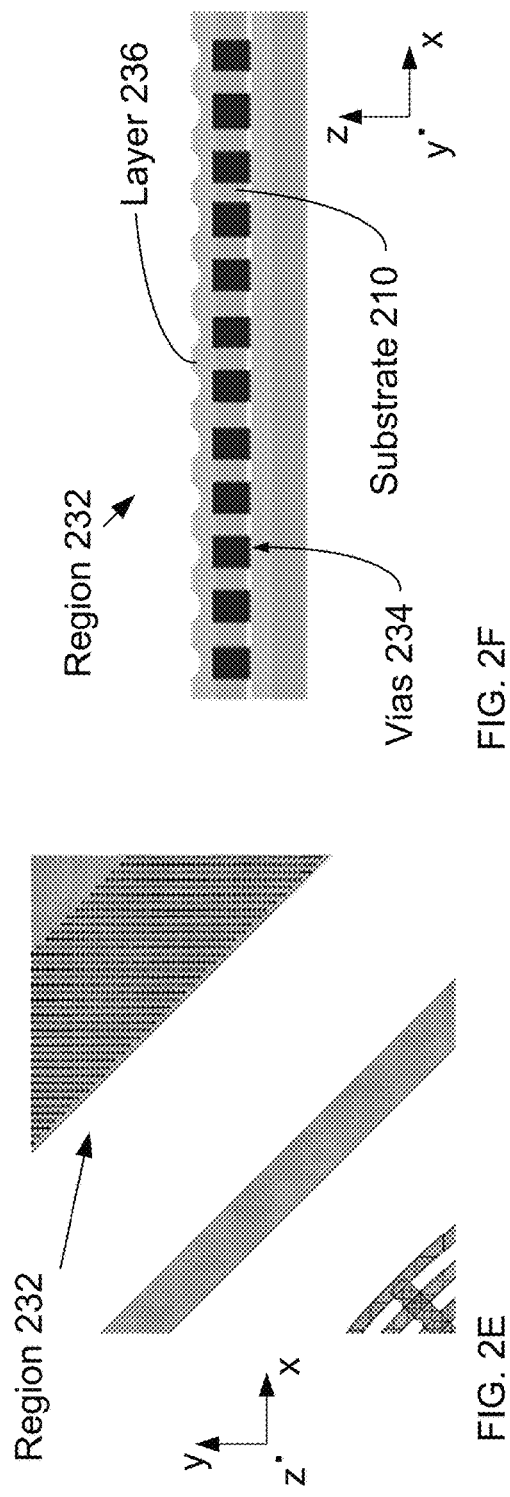
FIG. 2E
FIG. 2F

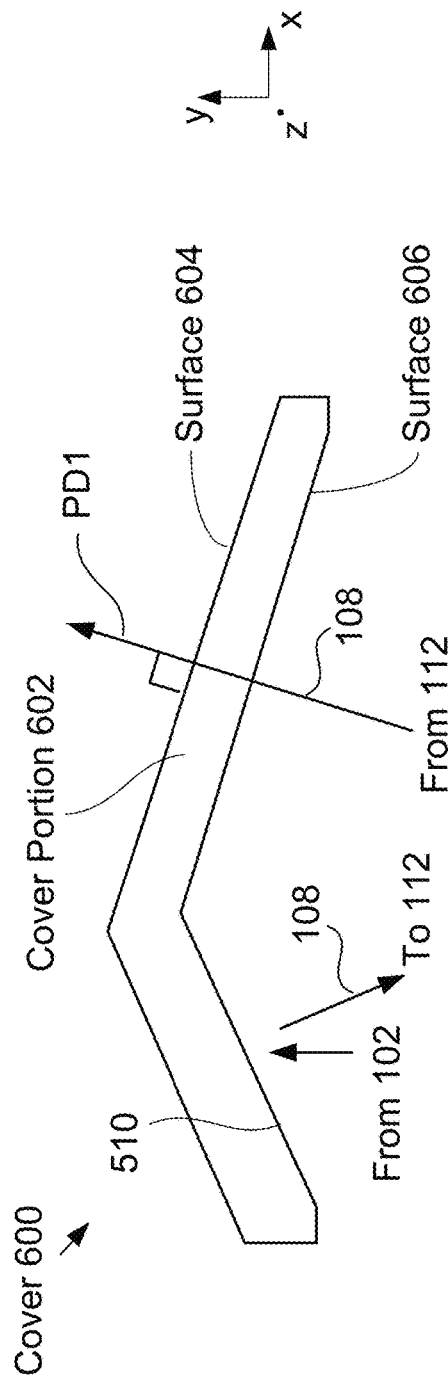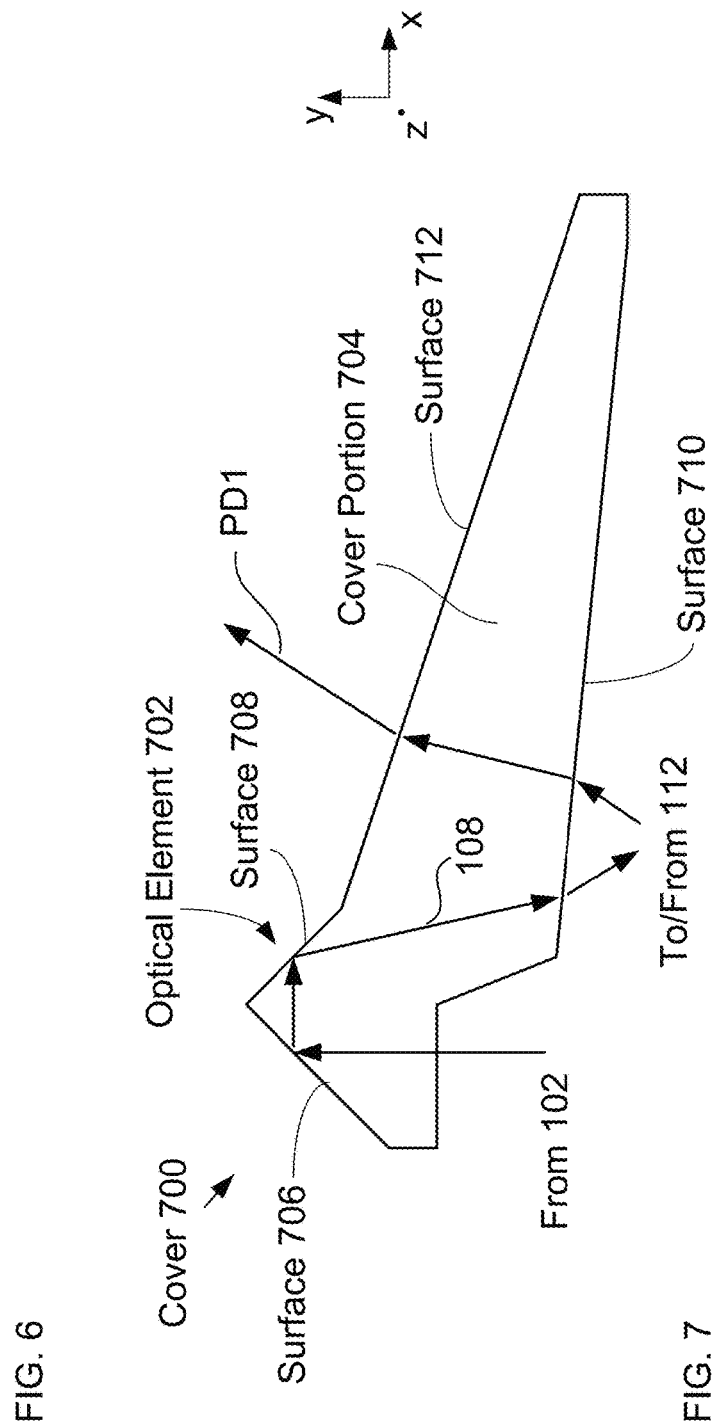
FIG. 6
FIG. 7

ADVANCED PACKAGING FOR COMPACT OBJECT-SCANNING MODULES

CROSS REFERENCE TO RELATED APPLICATIONS

This application is a continuation-in-part of co-pending U.S. Non-Provisional patent application Ser. No. 16/232,410, filed Dec. 26, 2018, which claims the benefit of U.S. Provisional Patent Application Ser. No. 62/610,493 filed Dec. 26, 2017, each of which is incorporated by reference as if set forth at length herein.

This application also includes concepts disclosed in U.S. Patent Publication No. US2016/0166146, published Jun. 16, 2017, and U.S. Patent Publication No. US2017/0276934, published Sep. 28, 2017, each of which is incorporated by reference as if set forth at length herein. If there are any contradictions or inconsistencies in language between this application and the cases that have been incorporated by reference that might affect the interpretation of the claims in this case, the claims in this case should be interpreted to be consistent with the language in this case.

TECHNICAL FIELD

The present disclosure relates to optical packaging in general and, more particularly, to packaging for optical MEMS devices, such as MEMS-mirror-based beam-steering systems.

BACKGROUND

Light scanners that integrate infrared (IR) illumination, beamforming and two-dimensional scanning functions are useful in a number of applications, such as eye tracking, micro-gesture recognition, industrial light curtains, range finding using LIDAR or point-cloud projection, free-space optical communication, path planning and control in robotics, object tracking in VR, to name a few.

Prior-art light scanners are typically based on scanning mirrors and actuators for moving them that are all on the order of 1 mm. To enable a large rotation, the package that surrounds the scanning mirror must have sufficient clearance. As a result, the dimensions of a prior-art packaged scanning mirror are quite large. In addition, in prior-art light-scanning systems, the light sources and refractive collimating optics required to produce a collimated light beam reside outside the scanning-mirror package, further increasing the space required for such light scanners. Still further, these light sources and optical elements are typically large, bulky, and expensive, which can limit their utility in some applications.

A compact light scanner that enables object tracking with high resolution and low cost would be a significant advance in the state of the art.

SUMMARY

The teachings of the present disclosure enable the reduction of the footprint and profile of a packaged light scanner suitable for use in an object-tracking system. Embodiments in accordance with the present disclosure are particularly well suited for use in systems for eye tracking, micro-gesture recognition, industrial light curtains, range finding using LIDAR or point-cloud projection, free-space optical communication, path planning and control in robotics, object tracking in virtual-reality and/or augmented reality systems. Furthermore, the packaging concepts described herein are suitable for use in mobile products, such as smart watches, smart phones, smart glasses, and the like, many of which require components and modules having an extremely small footprint.

Light scanners in accordance with the present disclosure are low-profile, fully packaged, sealed modules having small lateral dimensions and height, resulting in small overall package size and low profile.

An illustrative embodiment is a light scanner comprising a low-profile package housing comprising a substantially transparent cover. The housing defines an environmentally sealed chamber that encloses a light source and a MEMS-based, isothermal, two-axis scanner. The light source is a vertical-cavity surface-emitting laser (VCSEL), which provides a light signal to the MEMS scanner via an optical element integrated in a cover that is part of the housing. The optical path between the light source and MEMS scanner is folded by the optical element disposed on the cover, thereby enabling an extremely small package size for the light scanner. The MEMS scanner receives the light signal from the optical element and reflects it through the cover as the output signal of the light scanner, while steering the output signal in two dimensions.

In some embodiments, the optical element is a reflective lens that collimates the light provided by the light source and directs it to the MEMS scanner. In some of these embodiments, the reflective lens and MEMS-based beam-steering element are configured such that phase-error introduced by the beam-steering element is at least partially corrected at the reflective lens. In some embodiments, the optical element is a metalens. In some embodiments, the optical element is a metasurface.

In some embodiments, the cover is a dome whose surface contributes to the optical performance of the optical element disposed on it.

An embodiment in accordance with the present disclosure is a light scanner for steering a light signal in at least one dimension, the light scanner comprising: a light source configured to provide a first light signal; a first optical element configured to direct a second light signal to a scanning element, wherein the second light signal includes at least a portion of the first light signal; a MEMS scanner operative for steering the second light signal in at least one dimension, the MEMS scanner comprising the scanning element and a first thermal actuator configured to rotate the scanning element about a first axis; and a housing that includes: (i) a first substrate; and (ii) a cover comprising a first material that is substantially transparent for the second light signal, wherein the cover includes the first optical element; wherein the housing encloses a sealed chamber that contains the light source and the MEMS scanner; and wherein the light source, MEMS scanner, and cover are arranged such that the scanner is operative for directing the second light signal through the cover.

BRIEF DESCRIPTION OF THE DRAWINGS

FIG. 2C depicts a schematic drawing of a cross-sectional view of an exemplary light-scanner arrangement having stray-light control capability in accordance with the present disclosure.

FIG. 2D depicts a schematic drawing of a portion of a stray-light-control region in accordance with the illustrative embodiment.

FIGS. 2E-F depict schematic drawings of top and cross-sectional views of an alternative stray-light-control region in accordance with the present disclosure.

FIG. 6 depicts a schematic drawing of a sectional view of an exemplary alternative cover for a light scanner in accordance with the present disclosure.

FIG. 7 depicts a schematic drawing of a sectional view of an exemplary alternative cover for a light scanner in accordance with the present disclosure.

DETAILED DESCRIPTION

Figure 1A:
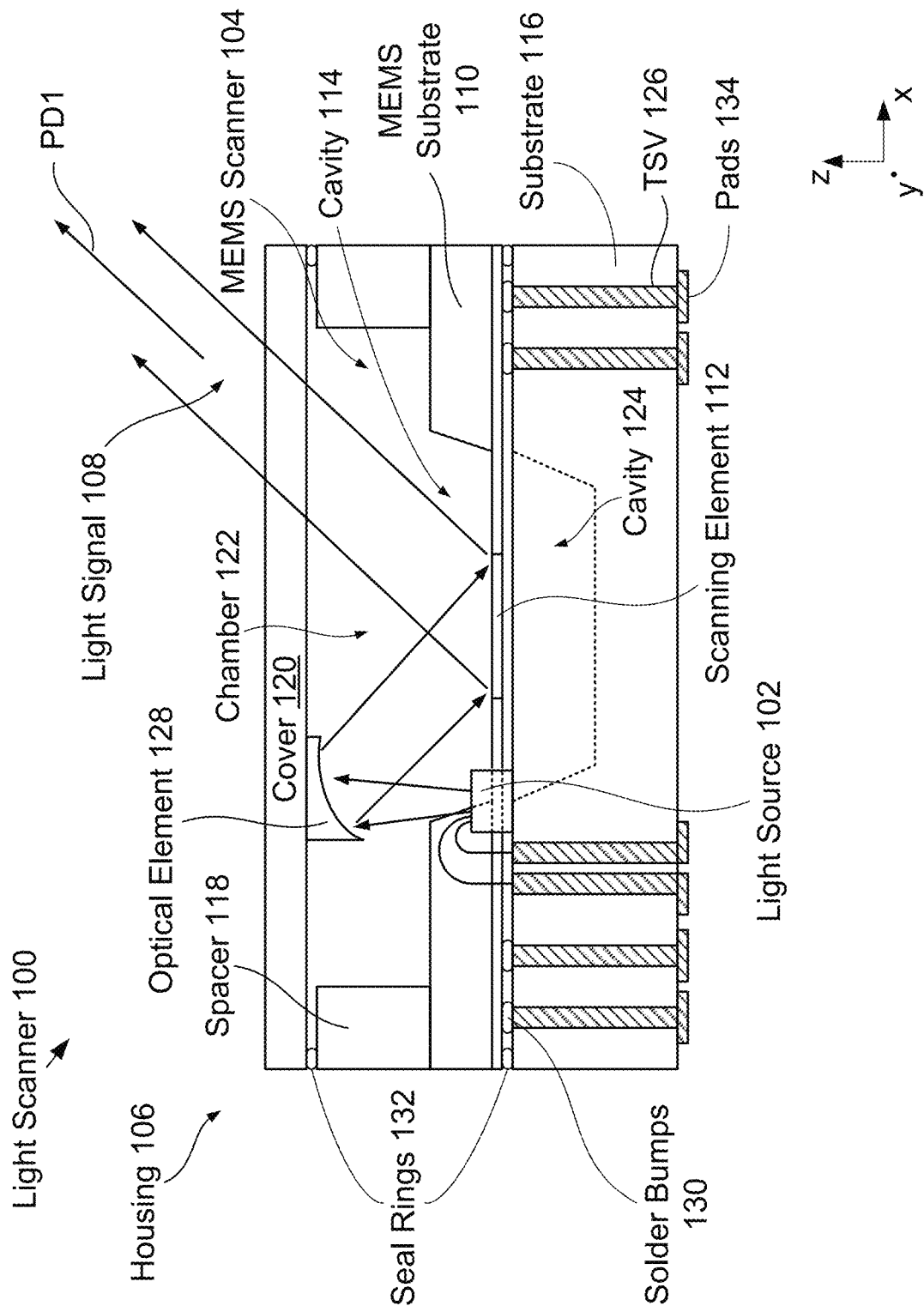
FIGS. 1A-B depict schematic drawings of cross-sectional and plan views, respectively, of an illustrative embodiment of light scanner in accordance with the present disclosure.
Figure 1B:
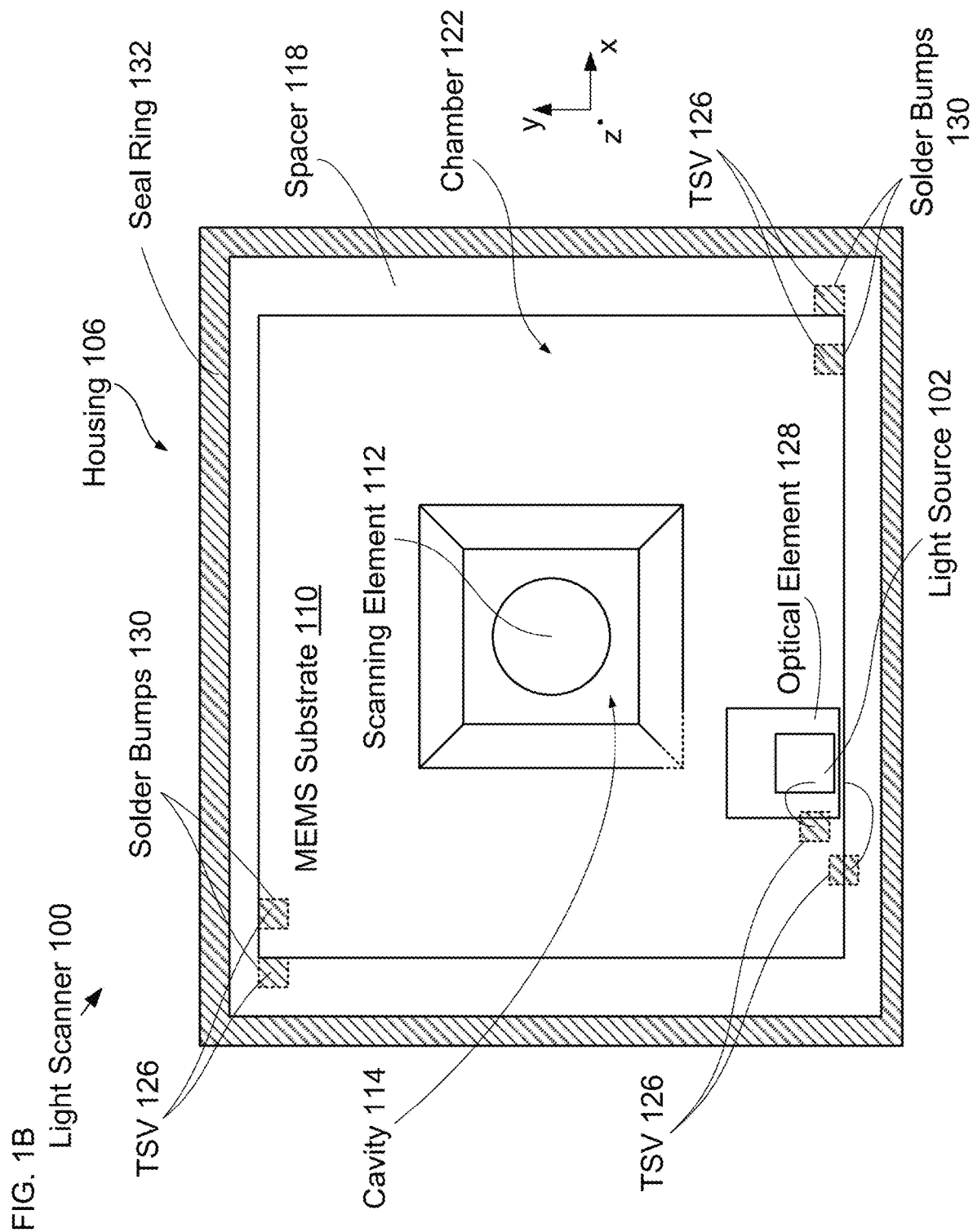

FIGS. 1A-B depict schematic drawings of cross-sectional and top views, respectively, of an illustrative embodiment of light scanner in accordance with the present disclosure. Light scanner 100 includes light source 102, MEMS scanner 104, and housing 106.

For the purposes of this Specification, including the appended claims, the term "MEMS scanner" is defined as a controllable micromechanical element operative for steering optical energy in at least one dimension, where the element is formed using fabrication techniques in accordance with the Micro Electro Mechanical Systems (MEMS) arts.

Light scanner 100 is a compact light-scanning module configured to steer light signal 108 in two dimensions about the central optical axis of the scan pattern, which defines propagation direction PD1. It should be noted that, although light scanner 100 scans light signal 108 in two dimensions, a light scanner in accordance with the present disclosure can be configured to scan a light signal in one dimension.

Light source 102 is a source for providing light signal 108. In the depicted example, light source 102 is a conventional vertical cavity surface emitting laser (VCSEL) suitable for use in embodiments in accordance with the present disclosure. In some embodiments, a different light source, such as a superluminescent diode, is included in light scanner 100. One skilled in the art will recognize, after reading this Specification, that the choice of light source 102 normally depends on the detector used with light scanner 100. Typically, light scanner 100 is intended for operation with a silicon photodetector, which is sensitive for wavelengths up to 1100 nm; however, other light detectors and/or wavelengths can be used without departing from the scope of the present disclosure.

MEMS scanner 104 is a two-dimensional (2D) scanning device for steering a light signal in two dimensions.

Figure 2A:
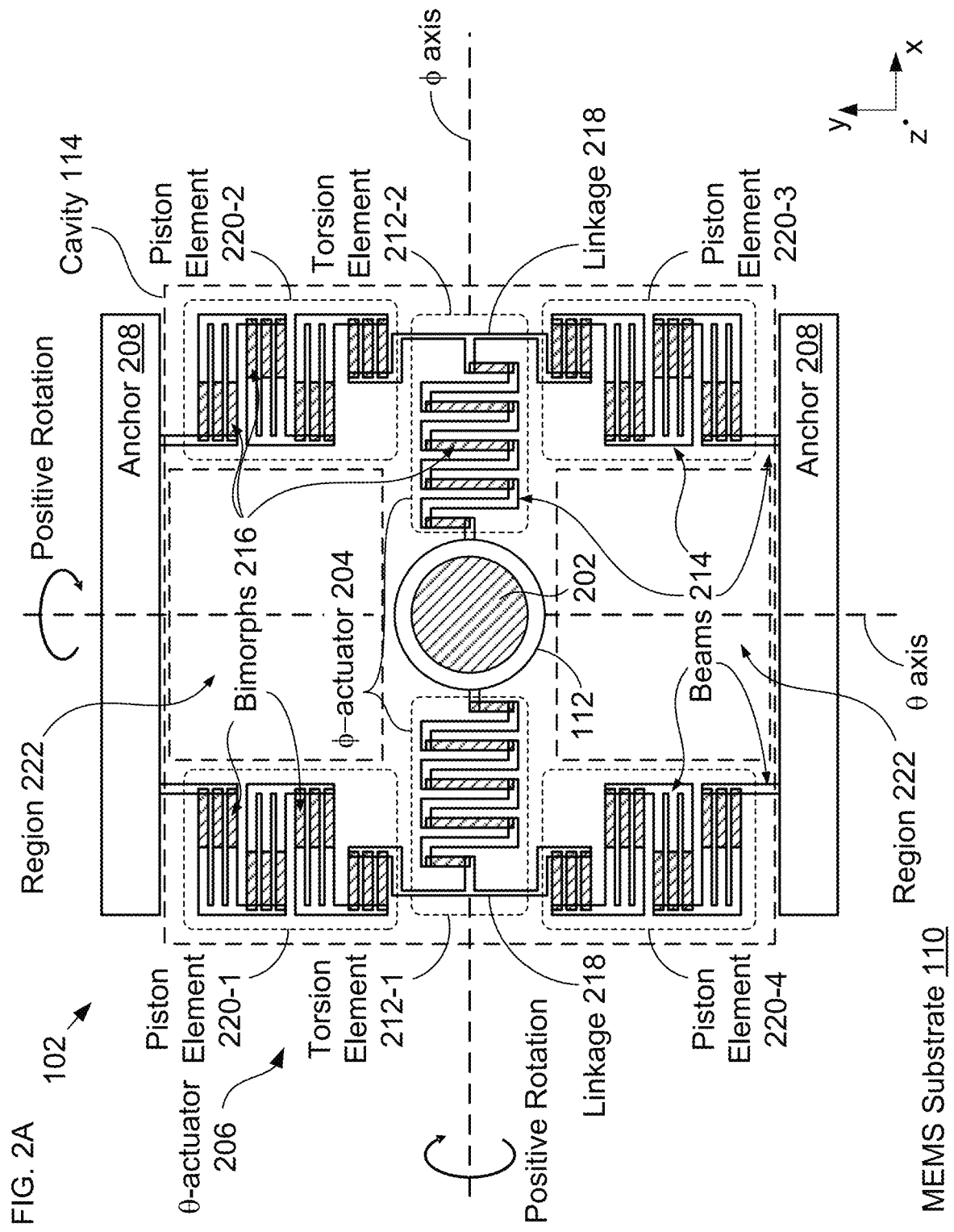
FIG. 2A depicts a schematic drawing of a plan view of MEMS scanner 104.

FIG. 2A depicts a schematic drawing of a plan view of MEMS scanner 104. MEMS scanner 104 includes scanning element 112, φ-actuator 204, θ-actuator 206, and anchor 208, which are disposed on MEMS substrate 110.

In the depicted example, MEMS substrate 110 is a conventional single-crystal silicon wafer suitable for the formation of conventional integrated circuits. In some embodiments, MEMS substrate 110 is a different substrate suitable for use in planar-processing-based MEMS-device fabrication, such as a silicon-on-insulator substrate, a glass substrate, a compound semiconductor substrate, and the like. Materials suitable for use in MEMS substrate 110 include, without limitation, polysilicon, silicon carbide, silicon-germanium, III-V semiconductors, II-VI semiconductors, glasses, dielectrics, ceramics, composite materials, and the like.

In the depicted example, MEMS substrate 110 includes cavity 114, which is formed beneath scanning element 112, φ-actuator 204, and θ-actuator 206 in conventional fashion. Cavity 114 enables a large range of angular motion for scanning element 112. It also allows MEMS scanner 104 to be mounted upside down in housing 106, thereby enabling the use of solder bonding (or another suitable bonding process) to electrically connect the actuators to through-substrate vias 126, as discussed below.

Scanning element 112 is a structurally rigid plate that is mechanically coupled with φ-actuator 204 and θ-actuator 206 to collectively define a two-dimensional scanning device suitable for fabrication via planar processing techniques.

In the depicted example, MEMS scanner 104 includes optical element 202, which is an aluminum-based circular mirror disposed on scanning element 112; however, in some embodiments, MEMS scanner 104 includes a different optical element, such as a different diffractive optical element (DOE), a Fresnel zone plate, a reflective lens, a refractive lens, a prism, a holographic element, and the like. In some embodiments, MEMS scanner 104 includes an optical element having a shape other than circular, such as square, elliptical, irregular, etc.

Scanning element 112 is operatively coupled with each of φ-actuator 204 and θ-actuator 206, which are electro-thermal actuators. The use of electro-thermo-mechanical actuators to control the position of scanning element 112 about its rotation axes affords embodiments in accordance with the present disclosure significant advantages over the prior art, such as:

i. CMOS-compatible operating voltage (3.3V); or
   ii. small footprint (present embodiment 700 μm×700 μm); or
   iii. large static angular deflection (>+/−45 degrees mechanical in 2 DOF); or
   iv. low power (<10 mW); or v. high speed 5-kHz resonance); or
vi. low cost; or
vii. any combination of i, ii, iii, iv, v, and vi.

Furthermore, it is also preferred that each of φ-actuator 204 and θ-actuator 206 is an isothermal actuator, since isothermal actuation mitigates parasitic effects that arise from thermal coupling between axes of rotation. For the purposes of this Specification, including the appended claims, "isothermal operation" is defined as operation at a constant power dissipation throughout an operating range. A device or system that operates in isothermal fashion dissipates constant power over its operating range, which results in a steady-state heat flow into and out of the device or system. For example, an isothermal actuator is an actuator that operates at a constant power throughout its operating range. In some cases, an isothermal actuator includes a plurality of actuating elements where at least one of the actuating elements operates in non-isothermal fashion; however, the plurality of actuating elements is arranged such that they collectively operate in isothermal fashion.

Actuators suitable for use in MEMS scanner 104, as well as methods suitable for forming them, are described in U.S. Patent Publication 20150047078, entitled "Scanning Probe Microscope Comprising an Isothermal Actuator," published Feb. 12, 2015, and U.S. Patent Publication 20070001248, entitled "MEMS Device Having Compact Actuator," published Jan. 4, 2007, each of which is incorporated herein by reference.

Preferably, MEMS scanner 104 is suitable for fabrication in a conventional CMOS foundry; therefore, in the depicted example, therefore, the structural material used in MEMS scanner 104 is silicon. In some embodiments, MEMS scanner 104 comprises at least one element comprising a different material suitable for use as a MEMS structural material, such as polysilicon, silicon carbide, silicon-germanium, silicon dioxide, a III-V semiconductor, a II-VI semiconductor, a composite material, a metal, and the like.

φ-actuator 204 is an isothermal torsional actuator operative for rotating scanning element 112 about the φ-axis, which is substantially aligned with the x-axis in the depicted example. φ-actuator 204 includes torsion elements 212-1 and 212-2, each of which is mechanically coupled between scanning element 112 and anchors 208 by beams 214. Beams 214 are rigid linkages comprising the same structural material as scanning element 112 (i.e., single-crystal silicon, aluminum and silicon dioxide, etc.).

Each of torsion elements 212-1 and 212-2 includes a plurality of bimorphs 216, which are grouped into operative sets. Adjacent operative sets are rigidly interconnected via beams 214 such that bending of the operative sets within a torsion element is additive. For clarity, elements comprising structural material (e.g., the material of scanning element 112, anchors 208, and beams 214) is depicted without cross-hatching, while bimorph elements 216 are depicted with cross-hatching.

Torsion elements 212-1 and 212-2 are rigidly connected rigid linkages 218 and arranged such that they rotate about the φ-axis in the same direction when subjected to opposite temperature changes. As a result, their collective power dissipation remains constant during operation. The temperature of torsion elements 212-1 and 212-2 is controlled via controlling electrical power dissipation (i.e., ohmic heating) in the elements themselves. In some embodiments, the temperature of the bimorphs in the torsional elements is controlled by controlling power dissipation in ohmic heaters disposed on the elements. In some embodiments, a heat source external to the torsion elements is used to control their temperature, such as heater elements disposed on the surface of MEMS substrate 110.

θ-actuator 206 is an isothermal piston actuator operative for rotating scanning element 112 about the θ-axis, which is substantially aligned with the y-axis in the depicted example. θ-actuator 206 comprises piston elements 220-1 through 220-4 (referred to, collectively, as piston elements 220) which are arranged in isothermal pairs. θ-actuator 206 is mechanically coupled between linkages 218 and anchors 208 by a set of beams 214. Each of piston elements 220 includes a plurality of beams 214 and bimorphs 216, which are arranged to give rise to vertical actuation in response to a temperature change. The temperature of piston elements 220 is controlled as described above and with respect to torsional elements 212.

Upon their release from MEMS substrate 110, piston elements 220 collectively move scanning element 112 in the positive z-direction (i.e., away from the substrate surface). Each of the piston elements is designed such that an increase in its power dissipation gives rise to its contraction, thereby moving its connection to scanning element 112 toward the substrate. Piston elements 220 are arranged in isothermal pairs—piston elements 220-1 and 220-2 and piston elements 220-2 and 220-4. As a result, an increase in the power dissipated in piston elements 220-2 and 220-2 and a commensurate decrease in the power dissipated in piston elements 220-1 and 220-4 induces positive (as indicated) rotation of scanning element 112 about the θ-axis while maintaining a constant power dissipation in θ-actuator 206 overall. In similar fashion, by decreasing the power dissipated in piston elements 220-2 and 220-2 and increasing the power dissipated in piston elements 220-1 and 220-4 by the same amount, a negative rotation of scanning element 112 about the θ-axis is induced while the power dissipated in θ-actuator 206 remains constant.

As noted above, piston elements are merely one type of isothermal actuator that can be used in a MEMS scanner without departing from the scope of the present disclosure. For example, another type of isothermal actuator described in detail in U.S. Patent Publication 20150047078 is a serpentine rotational actuator, which is preferable for use in some applications.

Figure 2B:
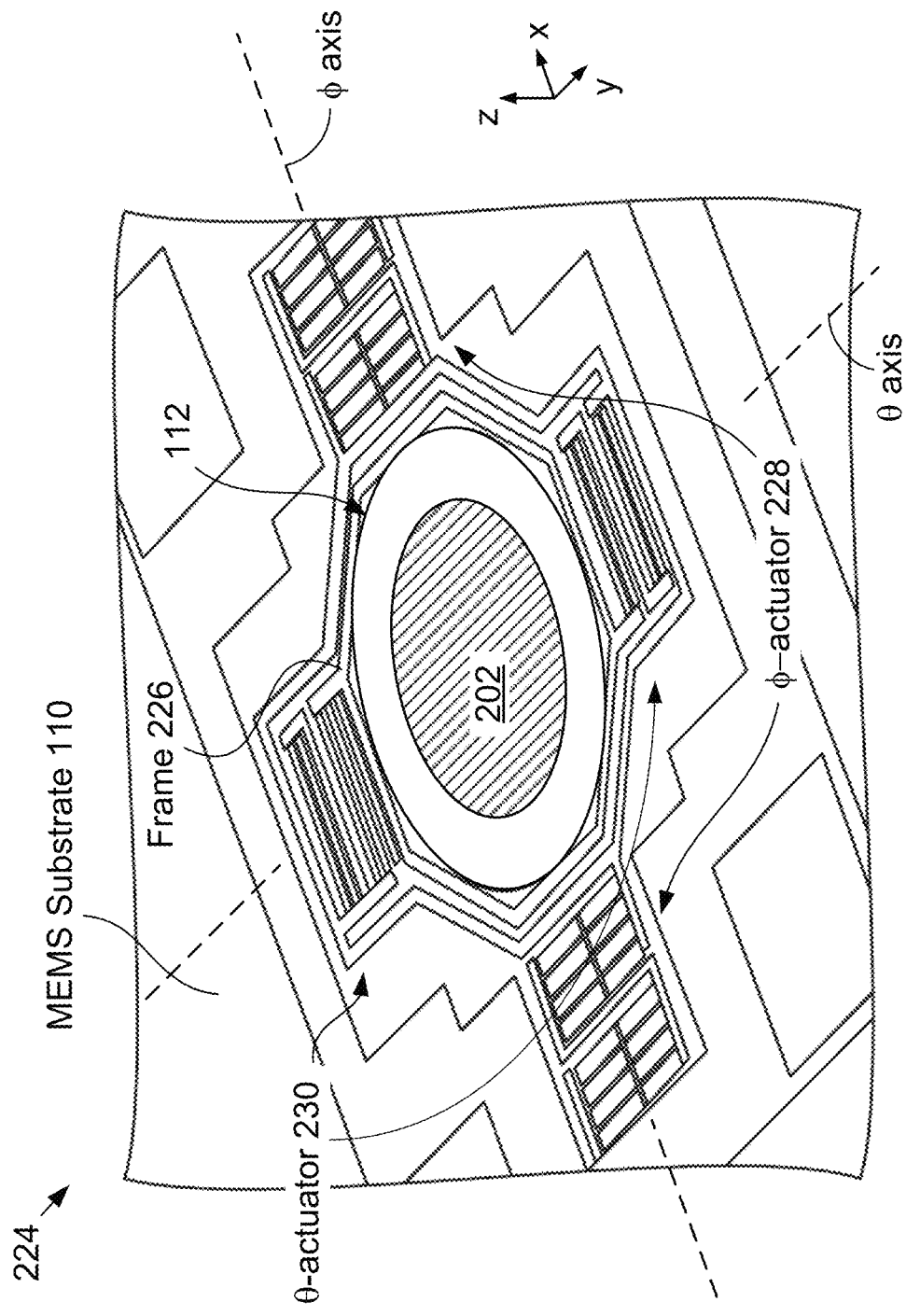
FIG. 2B depicts a schematic drawing of a perspective view of an alternative MEMS scanner comprising serpentine rotational actuators in accordance with the present disclosure.

FIG. 2B depicts a schematic drawing of a perspective view of an alternative MEMS scanner comprising serpentine rotational actuators in accordance with the present disclosure. MEMS scanner 224 is analogous to MEMS scanner 104; however, MEMS scanner 224 includes scanning element 112, mirror 202, frame 226, φ-actuator 228, and θ-actuator 230.

Frame 226 is a structural rigid frame of structural material.

Scanning element 112 is suspended within frame 226 via θ-actuator 230, while frame 226 is suspended above MEMS substrate 110 via φ-actuator 228.

Each of φ-actuator 228 and θ-actuator 230 is an isothermal serpentine rotational actuator that enables rotation about an axis with which the actuator is aligned. φ-actuator 228 and θ-actuator 230 are configured in a "gimbal" arrangement in which φ-actuator 228 is configured to rotate structurally rigid frame 226 about the φ-axis, while 0-actuator 230 is suspended within the frame and configured to rotate scanning element 112 about the θ-axis, which is orthogonal to the φ-axis.

The gimbal arrangement of φ-actuator 228 and θ-actuator 230 enables isothermal actuation with two rotational degrees of freedom.

It should be noted that the actuator and scanning element configuration of MEMS scanner 104 is merely one of many possible MEMS-based scanning element configurations within the scope of the present disclosure. Some alternative embodiments in accordance with the present disclosure include a φ-actuator and/or θ-actuator that is actuated by another actuation means, such as electrostatic, electromagnetic, magnetostrictive, piezoelectric, and the like. Some alternative embodiments in accordance with the present disclosure include an φ-actuator and/or θ-actuator that is non-isothermal. Some alternative embodiments in accordance with the present disclosure include a movable mirror that includes an optical element, such as one or more diffractive lenses (e.g., a one- or two-dimensional Fresnel lens, a holographic lens, etc.), one or more refractive lenses, an active optical source, one or more diffraction gratings, one or more prisms, and the like.

It is desirable that light scanners in accordance with the present disclosure mitigate the propagation of stray light, which can couple into other parts of larger systems in which the light scanners are used. Preferably, therefore, MEMS scanner 104 includes optional stray-light-control regions that are configured to enhance absorption of stray light and/or direct it to specific regions where it can be safely removed from the system.

FIG. 2C depicts a schematic drawing of a cross-sectional view of an exemplary light-scanner arrangement having stray-light control capability in accordance with the present disclosure. It should be noted that one or more stray-light control regions can be included in any light-scanner embodiment in accordance with the present disclosure.

As depicted in FIG. 2C, light directed to MEMS scanner 104 by optical element 128 overfills the scanning element of the MEMS scanner. However, light not directed into output signal 108 (i.e., "stray light") is redirected into substantially harmless directions by stray-light-control regions 222, which are located adjacent to the scanning element.

FIG. 2D depicts a schematic drawing of a portion of a stray-light-control region in accordance with the illustrative embodiment.

Stray-light-control region 222 includes a diffraction grating structure comprising alternative metal and clear regions, each having a width of approximately 1 micron.

FIGS. 2E-F depict schematic drawings of top and cross-sectional views of an alternative stray-light-control region in accordance with the present disclosure.

Region 232 includes a plurality of vias 234, which create small divots that give rise to a textured surface that substantially scatters light incident on it. In some embodiments, divots are created in the topmost device layer of a CMOS fabrication process (e.g., Metal4 in a four-metal-layer process). In some embodiments, the divots arise from vias formed between two metal layers within a CMOS structure (e.g., vias formed between metal layers Metal3 and Metal4), thereby creating divots in the more upper of the two metal layers.

Layer 236 is formed over the textured surface to create a highly reflective diffractive surface. In the depicted example, layer 236 is a layer of aluminum; however, other materials can be used in layer 236 without departing from the scope of the present disclosure. In some embodiments, layer 236 is a multi-layer dielectric material stack that defines a Bragg structure whose reflectivity is selected to mitigate reflection of a specific wavelength or range of wavelengths.

In some embodiments, a stray-light-control region includes one or more materials for absorbing light incident on it.

Returning now to FIG. 1, housing 106 includes substrate 116, spacer 118, and cover 120, which are joined to create chamber 122, which contains a protective environment for the light source and MEMS scanner. In some embodiments, chamber 122 is under vacuum. In some embodiments, chamber 122 is filled with a gas, such as forming gas, nitrogen, argon, and the like.

Substrate 116 is a conventional die-attach substrate suitable for mounting one or more semiconductor die, such as MEMS scanner 104, etc. In the depicted example, substrate 116 is made of low-temperature co-fired ceramic (LTCC) and includes cavity 124 and a plurality of through-substrate vias (TSV) 126. Cavity 124 enables rotation of scanning element 112 about its rotation axes, and TSV 126 enable electrical connection between each of light source 102 and MEMS scanner 104 and their respective contact pads 134 without compromising the integrity of environmentally sealed chamber 122. In some embodiments, substrate 116 is made of a different material. Materials suitable for use in substrate 116 include, without limitation, glasses, semiconductors, composite materials, other ceramics, and the like.

Light source 102 is mounted on substrate 116 and its electrical contacts are wire bonded to a pair of TSV 126. In some embodiments, at least one of the electrical contacts of light source 102 is made by soldering bumping its substrate to one of TSV 126.

MEMS scanner 104 is mounted upside down on substrate 116 and electrical connection is made between bond pads attached to actuators 204 and 206 and associated TSV 126 by conventional solder bumps 130.

In some embodiments, electrical connection to at least one of MEMS scanner 104 and light source 102 is made via connections other than through-substrate vias. One skilled in the art will recognize, after reading this Specification, that the inclusion of through-substrate vias in light scanner 100 can increase cost.

Spacer 118 is an annulus of structural material having a thickness that is selected based on the focal length of optical element 128, as discussed below. In the depicted example, spacer 118 comprises single-crystal silicon; however, as will be apparent to one skilled in the art, after reading this Specification, myriad materials can be used for spacer 118 without departing from the scope of the present disclosure. Spacer 118 is joined to MEMS substrate 110 in conventional fashion.

Cover 120 is a conventional substrate comprising a material that is substantially transparent for light signal 108. In some embodiments, only a portion of cover 120 is transparent for the light signal. In the depicted example, cover 120 comprises glass; however, many other materials are suitable for use in cover 120, including plastics or other polymers (e.g., PMMA, SU-8, etc.), composite materials, IR-transparent materials, and the like.

In some embodiments, to further mitigate the transmission of stray light, cover 120 includes a layer of blocking material (not shown) that is configured to prevent light transmission of all wavelengths of light through the cover other than the desired wavelength.

Cover 120 includes optical element 128. In the depicted example, optical element 128 is disposed on the inner surface of cover 120. In some embodiments, optical element 128 is disposed on the outer surface of cover 120.

Optical element 128 is reflective lens comprising a curved mirror configured as an off-axis parabolic mirror (OAP) that is configured to collimate the light provided by light source 102 and direct it to scanning element 112 as light signal 108.

In some embodiments, optical element 128 is disposed on a spacer whose thickness is selected to establish the proper distance from light source 102. In some embodiments, optical element 128 is has a shape other than an off-axis parabola, such as spherical, aspherical, free-form, etc.

Preferably, optical element 128 is designed such that substantially no spherical aberration occurs when light source 102 is located at its focal point. The curvature of the reflective surface of optical element 128 is that of a portion of parent parabola that is characterized by a focal point and axis of symmetry.

In some embodiments, optical element 128 is a diffractive element disposed on either the bottom or top surface of cover 120. For example, in some embodiments, optical element 128 is a diffractive optical element (DOE), such as a Fresnel lens, hologram, a segmented OAP having a Fresnel-like design, and the like. The use of a DOE for optical element 128 affords significant advantages in some cases, because the height of a DOE is typically much smaller than that of a reflective lens, such as an OAP, etc.

In some embodiments, optical element 128 is a "metalens," such as are described by Z. Li, et al., in "Meta-Optics achieves RGB-achromatic focusing for virtual reality," Science Advances, Vol. 7, No. 5, (2021)—(www.doi.org/10.1126/sciadv.abe4458), and by J. Engelberg, et al., in "The Advantages of metalenses over diffractive lenses," Nature Communications, Vol. 11, (2020)—(https://doi.org/10.1038/s41467-020-15972-9), each of which is incorporated herein by reference. For the purposes of this Specification, including the appended claims, the term "metalens" is defined as an optical component made of a substantially transparent phase-changing material having a structure that can be rearranged to control the way the material interacts with light. A metalens in accordance with the present disclosure typically includes a plurality of small patterned features that collectively function as a "metasurface" that can refract and/or reflect light in a desired fashion.

The use of a metalens as optical element 128 enables a very low-profile element that can be fabricated using large-volume production techniques, such as large-scale lithography, molding, stamping, and the like. Furthermore, a metalens-based optical component can be located on either of the top or bottom surfaces of cover 120 and configured to collimate and redirect light signal 108 as desired, as well as at least partially correct aberrations in the light signal.

Additional examples of optical elements suitable for use in accordance with the present disclosure are described in detail in the parent application.

In some embodiments, a metalens is included as part of light source 102 to collimate light signal 108 as it is emitted by the source.

Conventional seal rings 132 are used to join substrate 116 and MEMS substrate 110, as well as cover 120 and spacer 118, thereby enabling a substantially sealed environment within housing 106. Materials suitable for use in seal rings 132 include, without limitation, solders, epoxies, frits, and the like.

In some embodiments, seal rings 132 are formed via a bonding process, such as anodic bonding, gold-eutectic bonding, wafer-to-wafer bonding, plasma bonding, and the like.

In some embodiments, substrate 116 and spacer 118 are portions of a unitary structure and cover 120 is bonded to the upper portions of spacer 118 via seal ring 132. In some embodiments, spacer 118 and cover 120 are portions of a unitary body that is joined to substrate 116 via a seal ring analogous to seal ring 132.

Although the depicted example includes an arrangement of components in which both light source 102 and MEMS scanner (in an upside-down orientation) are disposed on the same surface of substrate 116, many alternative arrangements of components are possible without departing from the scope of the present disclosure. For example, in some alternative arrangements:

i. light source 102 is disposed on MEMS scanner 104; or
  ii. light source 102 is disposed on spacer 118; or
  iii. light source 102 is located within a cavity formed in substrate 116; or
  iv. MEMS scanner 104 is oriented with scanning element facing upward; or
  v. light source 102 is located on a bridging substrate disposed, in part, on MEMS substrate 110; or
  vi. any combination of i, ii, iii, iv, and v.

Figure 3:
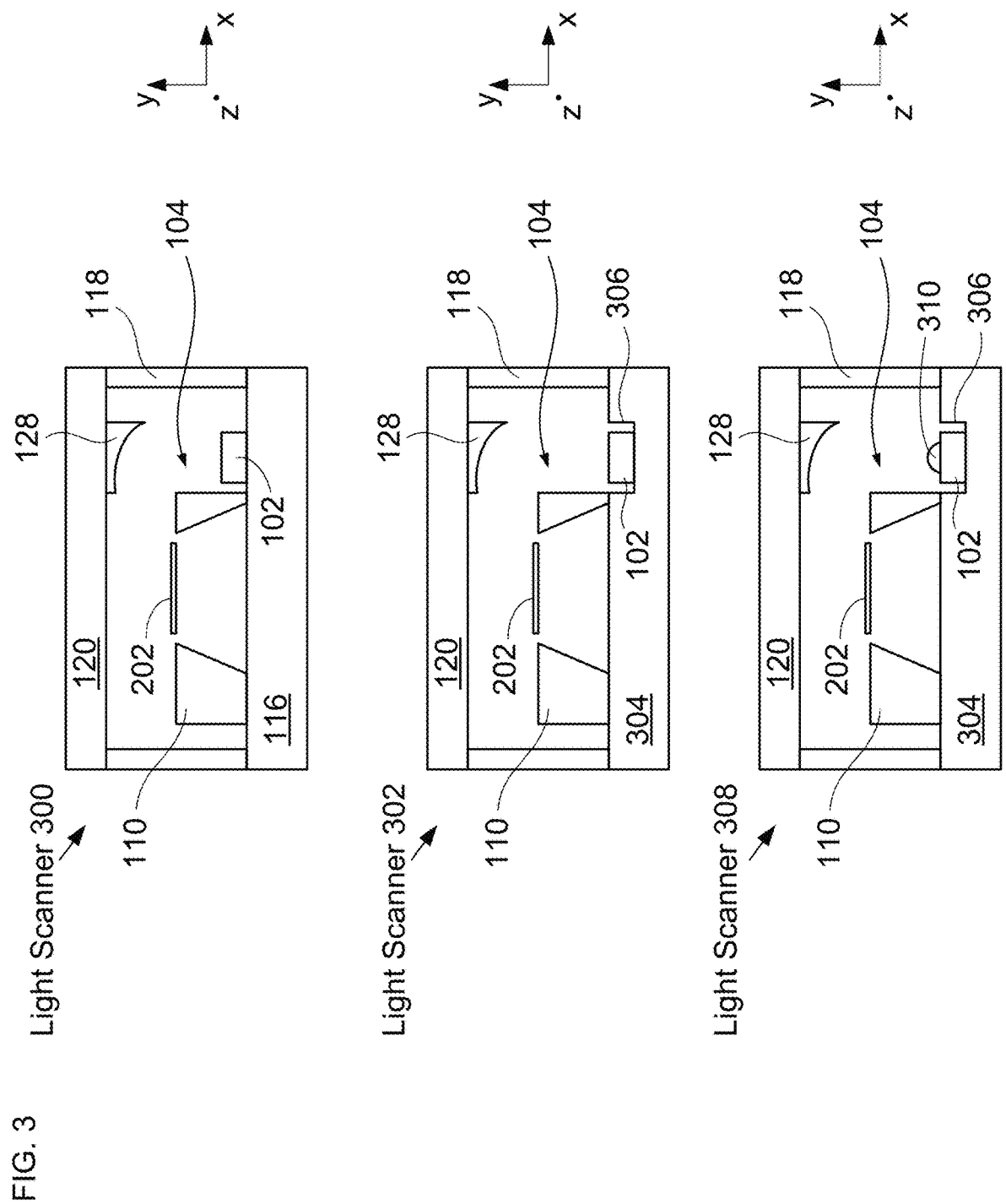
FIG. 3 depicts simplified schematic drawings of sectional views of exemplary alternative arrangements for a light scanner in accordance with the present disclosure.

FIG. 3 depicts simplified schematic drawings of sectional views of exemplary alternative arrangements for a light scanner in accordance with the present disclosure. Light scanner 300 includes an arrangement of components in which light source 102 is located on a different plane than optical element 202.

In the depicted example, light source 102 and MEMS scanner 104 are both mounted on substrate 116; however, the MEMS scanner is oriented such that optical element 202 is facing upward (i.e., it is distal to substrate 116).

Furthermore, since the thicknesses of their respective substrates is different, the emitting region of light source 102 is in a different plane than optical element 202—specifically, it is further from optical element 128. As a result, the distance between the mirror center and the aperture of the light source can be made smaller to enable a smaller overall package size for the light scanner.

Light scanner 302 includes an arrangement of components in which light source 102 is located within a cavity formed in substrate 116.

Substrate 304 includes cavity 306, whose depth is selected to locate the aperture of light source 102 further from optical element 128, thereby providing more alignment tolerance. Furthermore, cavity 306 mitigates die shifting that can occur after placement while bonding material cures.

Light scanner 308 includes an arrangement analogous to that of light scanner 302; however, in light scanner 308, light source 102 includes lens 310 located at its emission aperture.

In the depicted example, lens 310 is configured to decrease the divergence of the light emitted by light source 102 such that light signal 108 is smaller when received at optical element 128 without being clipped by MEMS substrate 110 or due to the light signal being larger than the optical element or mirror 202.

As discussed in U.S. Non-Provisional patent application Ser. No. 16/232,410 (i.e., the parent application), it can be beneficial to locate light source 102 on the substrate of MEMS scanner 104 (i.e., MEMS substrate 110).

Figure 4:
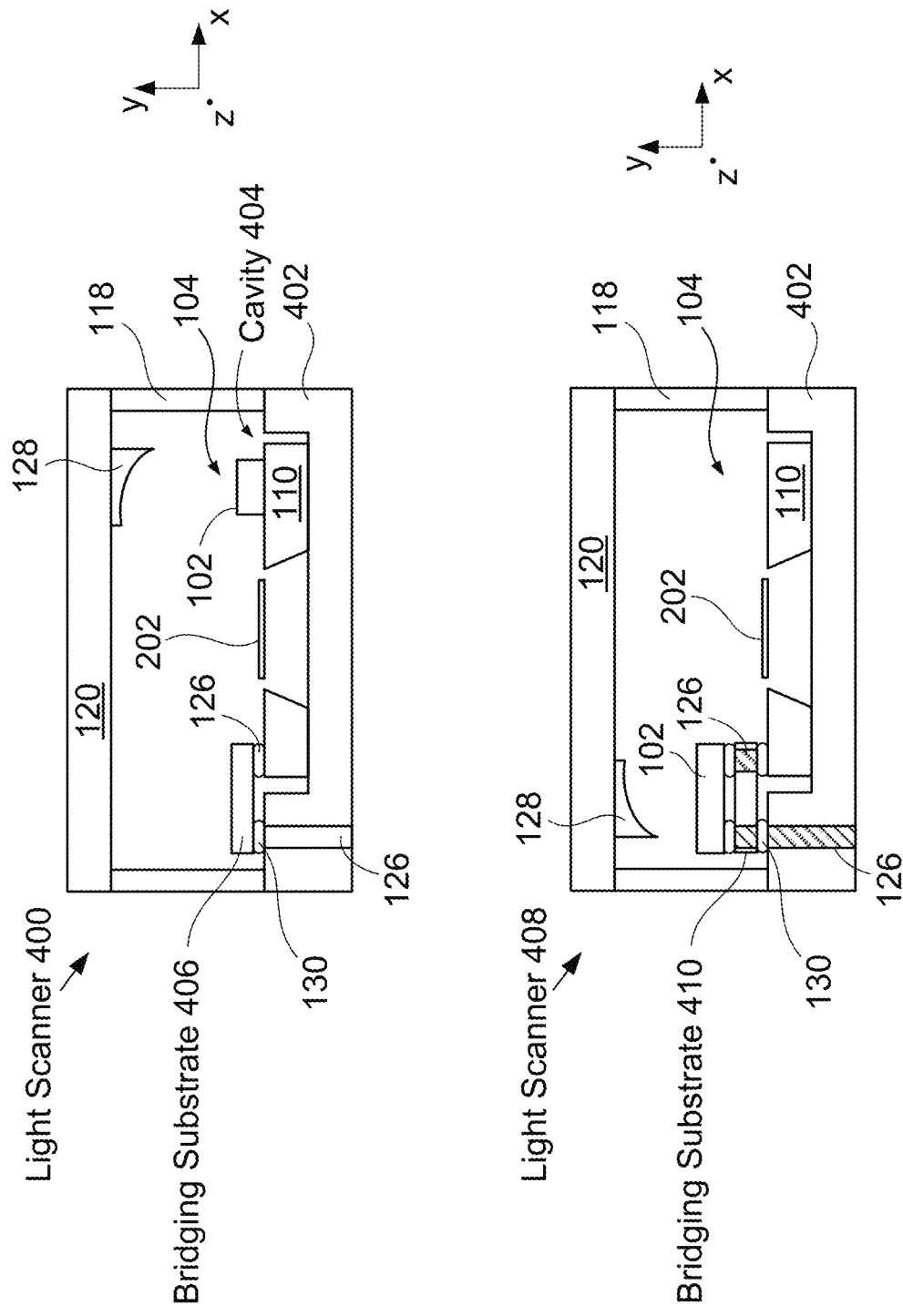
FIG. 4 depicts simplified schematic drawings of sectional views of exemplary alternative arrangements for a light scanner in which a light source is disposed on the substrate of a MEMS scanner in accordance with the present disclosure.

FIG. 4 depicts simplified schematic drawings of sectional views of exemplary alternative arrangements for a light scanner in which a light source is disposed on the substrate of a MEMS scanner in accordance with the present disclosure.

Light scanner 400 includes an arrangement of components in which light source 102 is located on MEMS substrate 110. In addition, the packaging of light scanner 400 avoids the use of wire bonds, thereby enabling lower cost assembly and/or smaller package size.

Substrate 402 is analogous to substrate 116; however, substrate 402 includes cavity 404, which is configured such that MEMS scanner 104 can reside in it and the surface of MEMS substrate 110 is substantially coplanar with the top surface of TSV 126.

As a result, bond pads (not shown) located on the top surface of the MEMS substrate can be electrically coupled with TSV 126 via bridging substrate 406 using conventional solder-bump bonding or another suitable bonding technique (e.g., gold-bump bonding, conductive epoxy, eutectic bonding, etc.).

Bridging substrate 406 is a conventional flip-chip bonding die that includes electrical traces suitable for connecting MEMS scanner 104 with the arrangement of TSV 126 (represented here by a single TSV 126; however, multiple TSV are typically included). In some embodiments, a bridging substrate includes active circuitry, such as circuits for driving one or both of light source 102 and MEMS scanner 104, mitigating electrostatic discharge, and the like.

Light scanner 408 is analogous to light scanner 400; however, in light scanner 408, light source 102 is mounted on top of bridging substrate 410, which includes additional TSV for electrically coupling the light source to TSV located in substrate 402.

Figure 5:
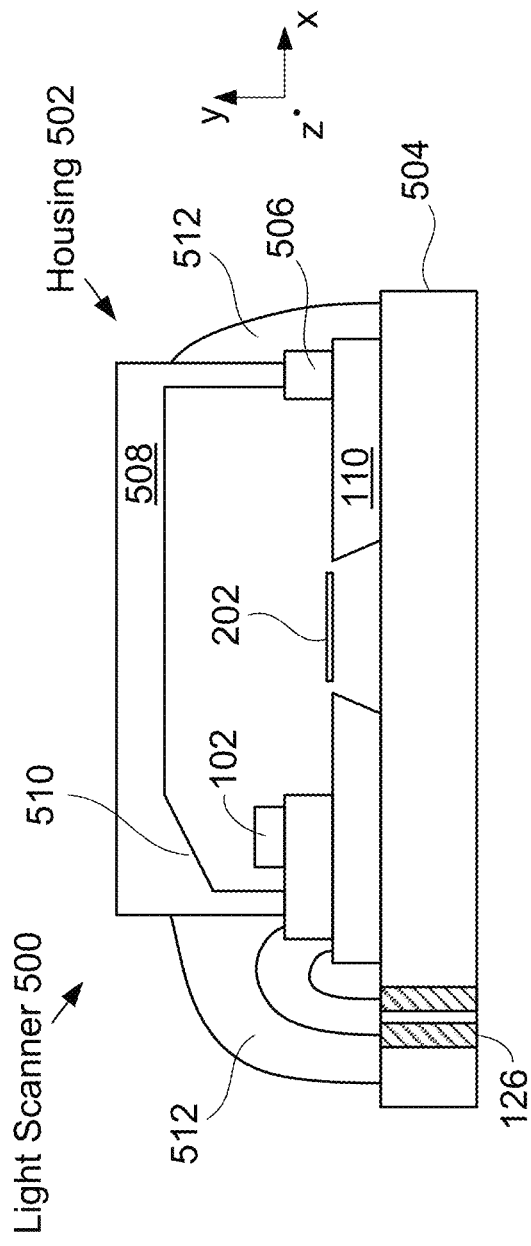
FIG. 5 depicts simplified schematic drawings of sectional views of exemplary alternative arrangements for a light scanner in accordance with the present disclosure.
Figure 5:
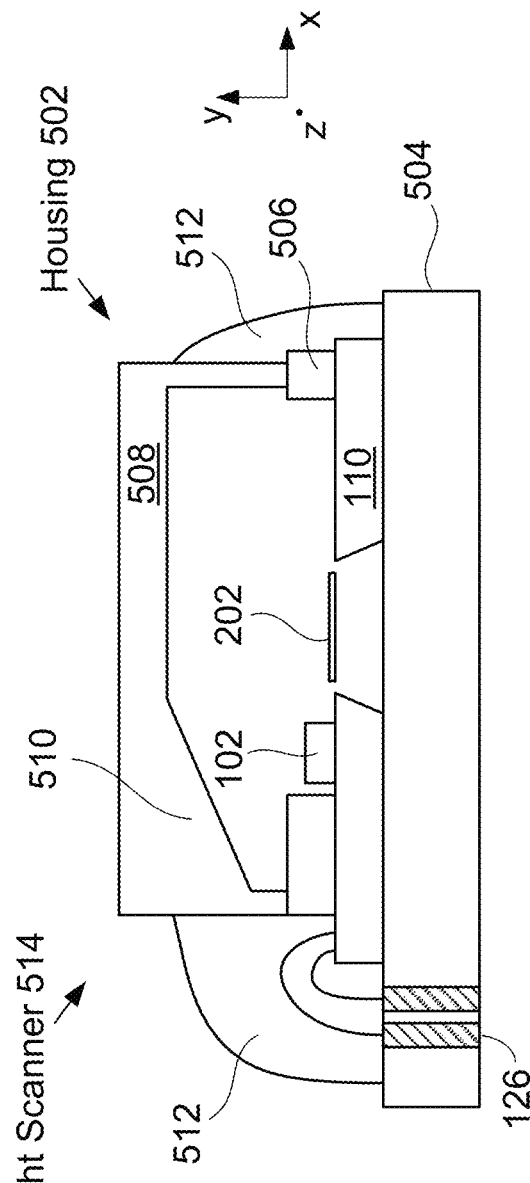

FIG. 5 depicts simplified schematic drawings of sectional views of exemplary alternative arrangements for a light scanner in accordance with the present disclosure.

Light scanner 500 includes housing 502, which comprises substrate 504, spacer 506, MEMS substrate 110, and cover 508.

Spacer 506 is analogous to spacer 118 described above; however, spacer 504 includes electrical traces that extend from bond pads inside housing 502 to bond pads located outside of the housing, thereby enabling external electrical access to light source 102, which is located on the spacer such that it is electrically connected to the bond pads inside the housing.

The bond pads outside chamber 122 are electrically connected to TSV 126 via conventional wire bonds.

Cover 508 is a molded plastic lid that includes optical element 510. In the depicted example, optical element 510 is a chamfered inner corner of the cover located above light source 102, which redirects light from the light source to optical element 202. In some embodiments, this inner corner is provided a highly reflective surface (e.g., metal, thin-film mirror layers, etc.). In some embodiments, optical element 510 is analogous to optical element 128.

To achieve, or improve, the environmental seal of light scanner 500, as well as protect exposed wire bonds, and mitigate delamination between bonded elements, encapsulating layer 512 is formed around the perimeter of housing 502. In the depicted example, encapsulating layer 512 is a bead of epoxy; however, myriad alternative materials can be used in an encapsulating layer without departing from the scope of the present disclosure.

Light scanner 514 is analogous to light scanner 500; however, in light scanner 514, light source 102 is mounted on MEMS substrate 110, which includes electrical traces that extend through housing 502. As a result, optical element 510 is enlarged to accommodate a lateral shift of the emission aperture of the light source.

For embodiments in which the housing of a light scanner comprises disparate materials (e.g., plastic cover, ceramic substrate, silicon spacer, etc.), the inclusion of encapsulating layer 512 can mitigate reliability issues that arise due to the different thermal-expansion coefficients of these materials.

FIG. 6 depicts a schematic drawing of a sectional view of an exemplary alternative cover for a light scanner in accordance with the present disclosure. Cover 600 includes optical element 510 and cover portion 602.

Cover 600 is analogous to cover 120; however, cover 600 is molded such that surfaces 604 and 606 of cover portion 602 are parallel to one another and substantially normal to propagation direction PD1 of light signal 108.

Cover 600 is fabricated using conventional molding techniques such that it has little or no sidewall, which can limit the scan range of light signal 108. As a result, the use of cover 602 in a light scanner can enable it to have a larger scan range.

Although the depicted example includes an optical element that comprises a simple reflecting facet, in some embodiments, optical element 510 includes a different optical element, such as an OAP, a DOE, a Fresnel lens, hologram, a segmented OAP having a Fresnel-like design, and the like. Furthermore, in some embodiments, an optical element (e.g., a refractive lens, a diffractive lens, OAP, etc.) is disposed on at least one of surfaces 604 and 606.

FIG. 7 depicts a schematic drawing of a sectional view of an exemplary alternative cover for a light scanner in accordance with the present disclosure. Cover 700 includes optical element 702 and cover portion 704.

Cover 700 is also analogous to cover 120; however, cover 700 is formed such that surfaces 706 and 708 of optical element 702 give rise to internal reflection that directs light signal 108 toward surface 710 of cover portion 704.

At surface 710, light signal 108 exits cover portion 704, which causes it to refract toward scanning element 112.

Scanning element reflects the light signal back toward surface 710, at which, it refracts into cover portion 704. At surface 712, light signal 108 again exits into free space, refracting again such that it is directed along propagation direction PD1, about which MEMS scanner 104 scans the light signal.

By employing total internal reflection, cover 700 requires no metallization or other coatings. Furthermore, total-internal reflection can occur with higher efficiency that reflection at a metal coating.

Figure 8:
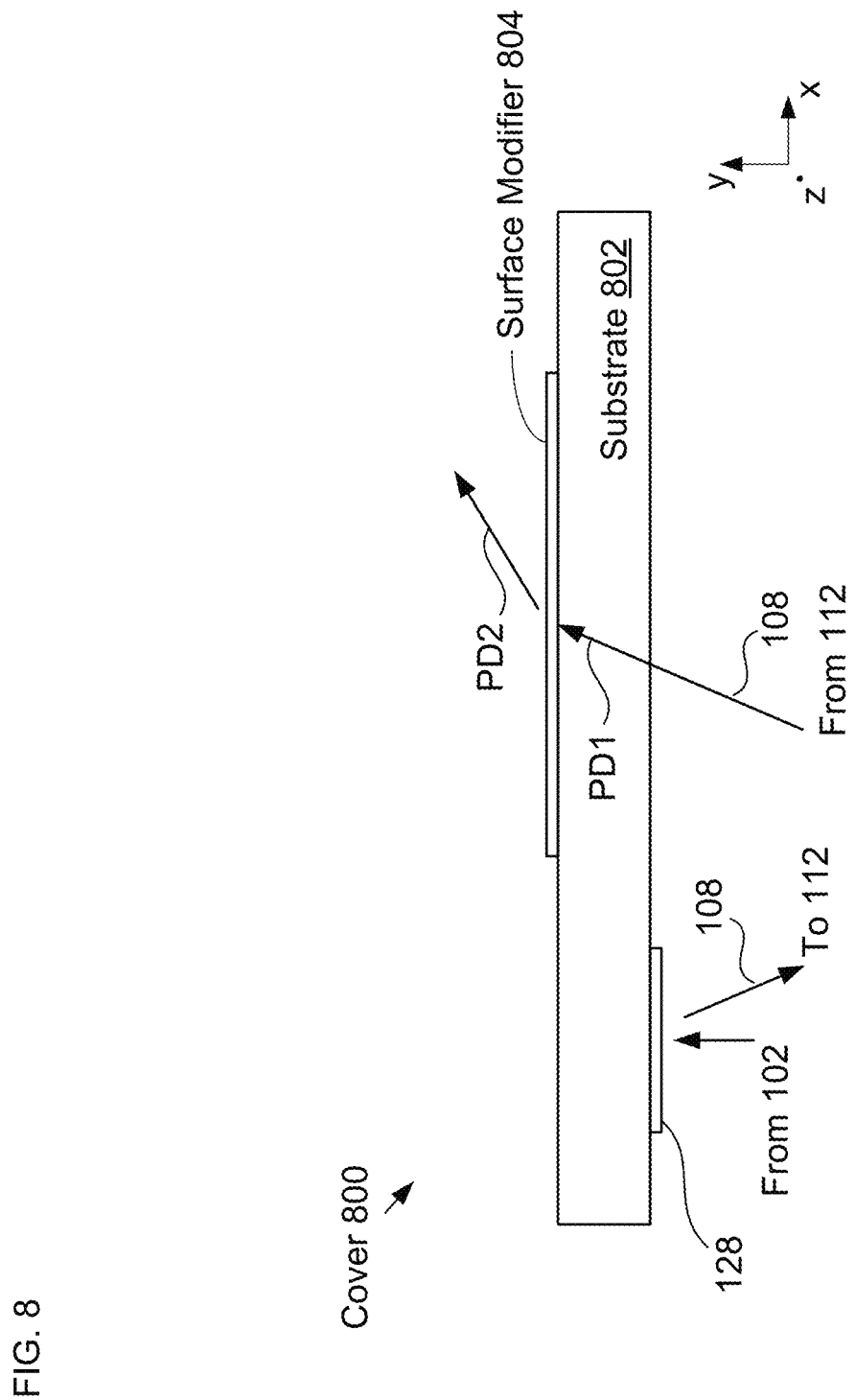
FIG. 8 depicts a schematic drawing of a sectional view of another exemplary alternative cover for a light scanner in accordance with the present disclosure.

FIG. 8 depicts a schematic drawing of a sectional view of another exemplary alternative cover for a light scanner in accordance with the present disclosure. Cover 800 includes substrate 802, optical element 128, and surface modifier 804.

Substrate 802 is a substantially flat plate of material that is substantially transparent for light signal 108. In the depicted example, substrate 802 is made of glass.

In the depicted example, optical element 128 is a meta lens configured as a collimation and redirection plate (CRP) that is disposed on the bottom surface of substrate 802; however, any suitable alternative optical element can be disposed on one of the top or bottom surface of the substrate.

Surface modifier 804 is a surface feature configured to magnify the angle at which light signal 108 exits substrate 802. In other words, surface modifier 804 changes the propagation direction of light signal 108 from propagation direction PD1 to propagation direction PD2, thereby increasing the scanning range of a light scanner in which cover 800 is used. In the depicted example, surface modifier 804 is a metasurface disposed on the top surface of substrate 802. In some embodiments, surface modifier 804 comprises a different optical element, such as a free-form optic, etc. In some embodiments, surface modifier 804 is configured to maintain or improve collimation of light signal 108.

Figure 9A:
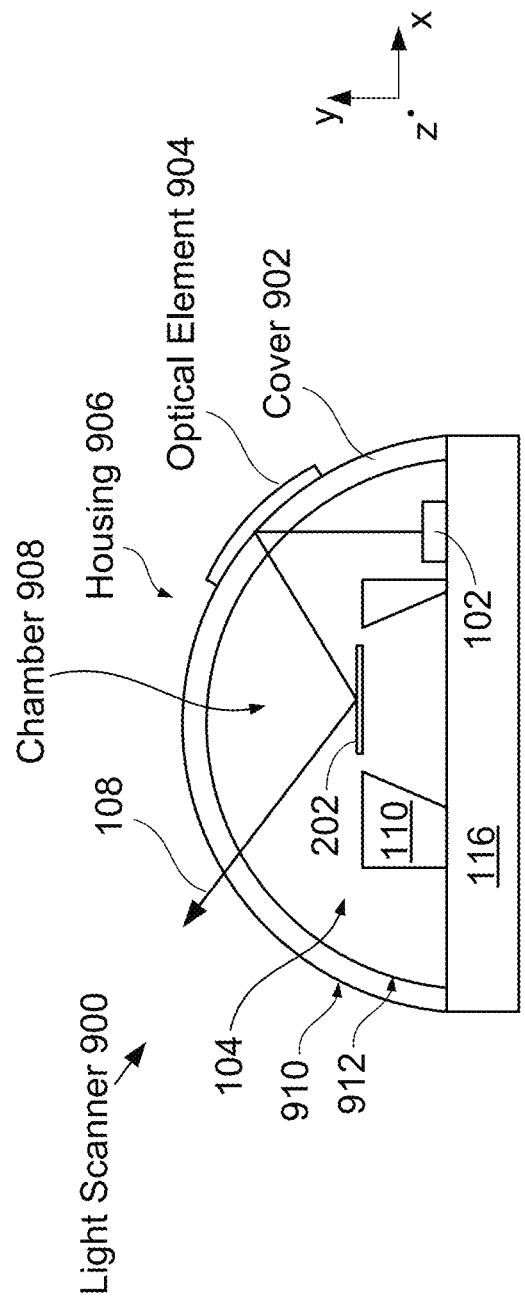
FIG. 9A depicts a schematic drawing of a sectional view of another exemplary alternative light scanner in accordance with the present disclosure.

FIG. 9A depicts a schematic drawing of a sectional view of another exemplary alternative light scanner in accordance with the present disclosure. Light scanner 900 is analogous to light scanner 100; however, light scanner 900 includes a dome-shaped cover whose shape is configured to provide optical functionality.

Cover 902 is a molded lid having a dome-like shape that is bonded to substrate 116 to define housing 906 and chamber 908, which encloses light source 102 and MEMS scanner 104.

Optical element 904 is disposed on outer surface 910 of cover 902. In the depicted example, optical element 904 is a layer of reflective metal that forms a reflective lens configured to collimate light received from light source 102 and direct collimated light signal 108 to optical element 202 of MEMS scanner 104. As will be apparent to one skilled in the art, after reading this Specification, a reflective element formed on a curved region of either of surfaces 910 and 912 defines a reflective lens that is substantially rotationally symmetric, which mitigates alignment issues, as well as providing more in-use tolerance to changes of mirror curvature.

In some embodiments, optical element 904 comprises an element other than a reflective lens, such as a DOE, an OAP, a Fresnel-like lens, a metalens, a metasurface, and the like. In some embodiments, optical element 904 is disposed on inner surface 912.

It should be noted that the use of a domed cover affords significant advantages over the prior art, such as greater scanning range, an ability to exploit the inherent lensing characteristics of the domed cover, and smaller package size. Furthermore, because the cover is dome shaped, light signal 108 is always substantially normal to its surfaces, thereby mitigating scan bias, as well as optical aberrations and loss in some cases.

In the depicted example, light source 102 and MEMS scanner 104 are disposed on substrate 116. As discussed above, however, in some embodiments, light source 102 is disposed on MEMS substrate 110 or on a spacer located between cover 902 and substrate 116.

In some embodiments, light scanner 900 includes additional reflective elements disposed on, for example, MEMS substrate 110, substrate 116, surface 910, surface 912, and the like, such that the optical path for light signal 108 is folded multiple times within housing 906 (e.g., multiple times between light source 102 and optical element 202), thereby enabling a larger scan range and/or a smaller overall package footprint.

Figure 9B:
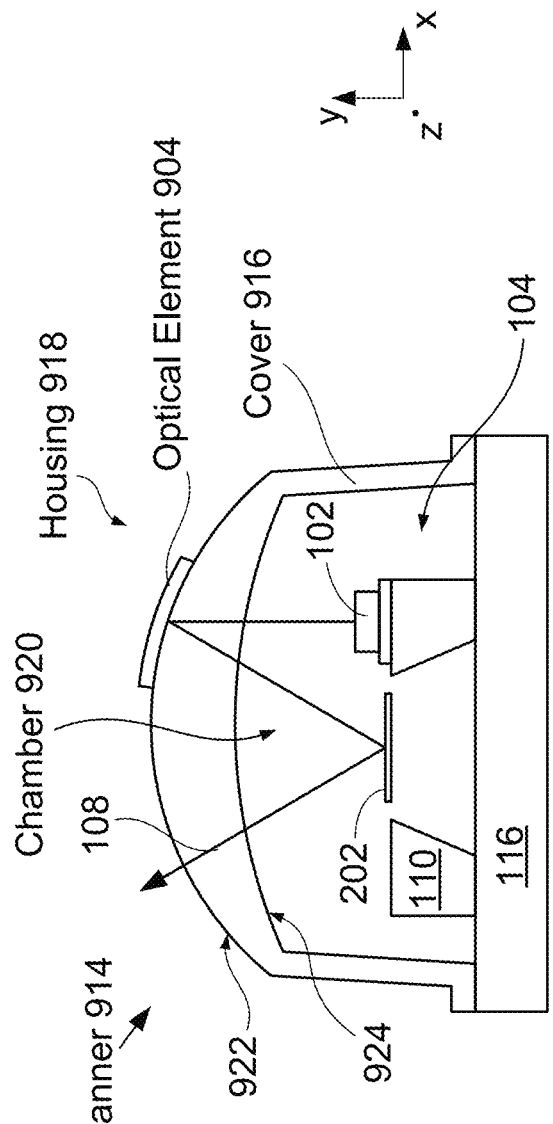
FIG. 9B depicts a schematic drawing of a sectional view of yet another exemplary alternative light scanner in accordance with the present disclosure.

FIG. 9B depicts a schematic drawing of a sectional view of yet another exemplary alternative light scanner in accordance with the present disclosure. Light scanner 914 is analogous to light scanner 900; however, light scanner 914 includes a cover whose shape is configured provide significant lensing capability.

Cover 916 is a molded lid that is bonded to substrate 116 to define housing 918 and chamber 920, which encloses light source 102 and MEMS scanner 104. In some embodiments, cover 916 includes a plurality of piece parts that are joined together to define the cover. It should be noted that, in the depicted example, light source 102 is disposed on MEMS substrate 110 (via an optional shim); however, any configuration of light source and MEMS scanner can be used within chamber 920.

Cover 916 includes surfaces 922 and 924, which are configured to collectively define a refractive lens that at least partially collimates light signal 108 as it passes through cover 916 enroute to optical element 904, which is disposed on surface 924. Surfaces 922 and 924 work in conjunction with optical element 904 such that light signal 108 exits light scanner 914 as a collimated beam.

Figure 10A:
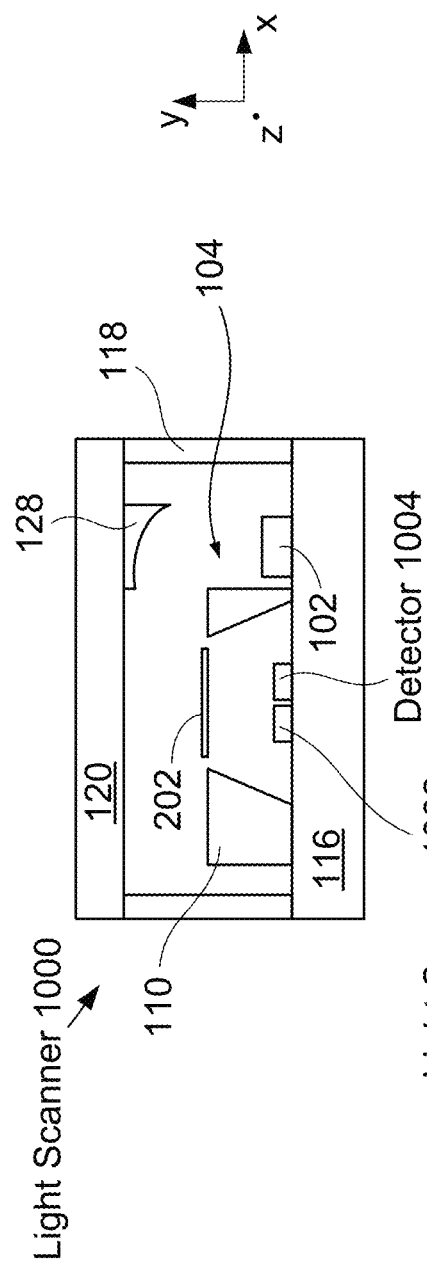
FIGS. 10A-B depict schematic drawings of more exemplary alternative light scanners in accordance with the present disclosure.
Figure 10B:
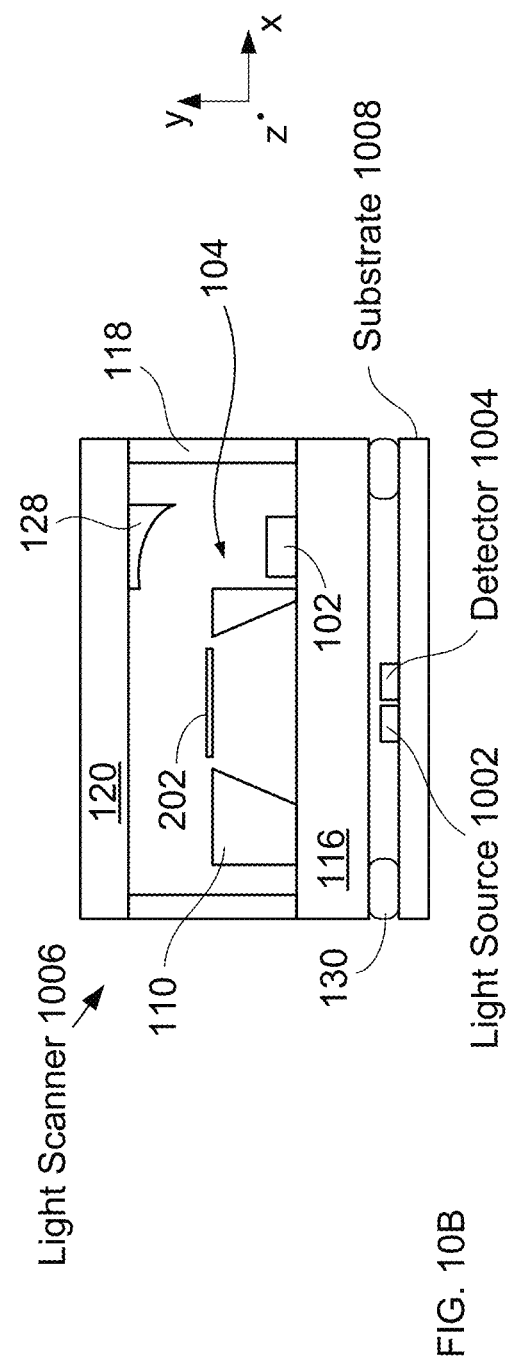

FIGS. 10A-B depict schematic drawings of more exemplary alternative light scanners in accordance with the present disclosure. Light scanner 1000 is analogous to light scanner 300; however, light scanner 1000 includes conventional light source 1002 and conventional detector 1004, which collectively provide position-sensing capability for tracking the motion of optical element 202.

Light source 1002 reflects light off the backside of optical element 202 toward detector 1004. The output signal of detector 1004 is then used to track the position of the optical element to, for example, provide positional feedback for closed-loop control of the MEMS scanner, enable position calibration, light source calibration, and the like.

In the depicted example, light source 1002 is a conventional VCSEL and detector 1004 is a conventional photodetector (e.g., a photodiode, etc.); however, any suitable light source and/or detector can be used without departing from the scope of the present disclosure. It should be noted that light source 1002 and light source 102 can operate at different wavelengths or wavelength ranges.

Light scanner 1006 is analogous to light scanner 1000; however, in light scanner 1006, light source 1002 and detector 1004 are disposed on substrate 1008.

Substrate 1008 is analogous to substrate 116 and is joined to substrate 116 in conventional fashion (e.g., via solder bumps 130, as depicted) such that the optical path between light source 1002 and detector 1004 passes through substrate 116. Preferably, in such embodiments, substrate 116 is glass; however, any substrate that is substantially transparent for the light provided by light source 1002 can be used.

As noted above, where possible, it can be desirable to avoid the use of wire bonds in a light scanner by employing bonding techniques and through-substrate vias and/or electrical traces that transit the walls of a light-scanner housing.

Figure 11:
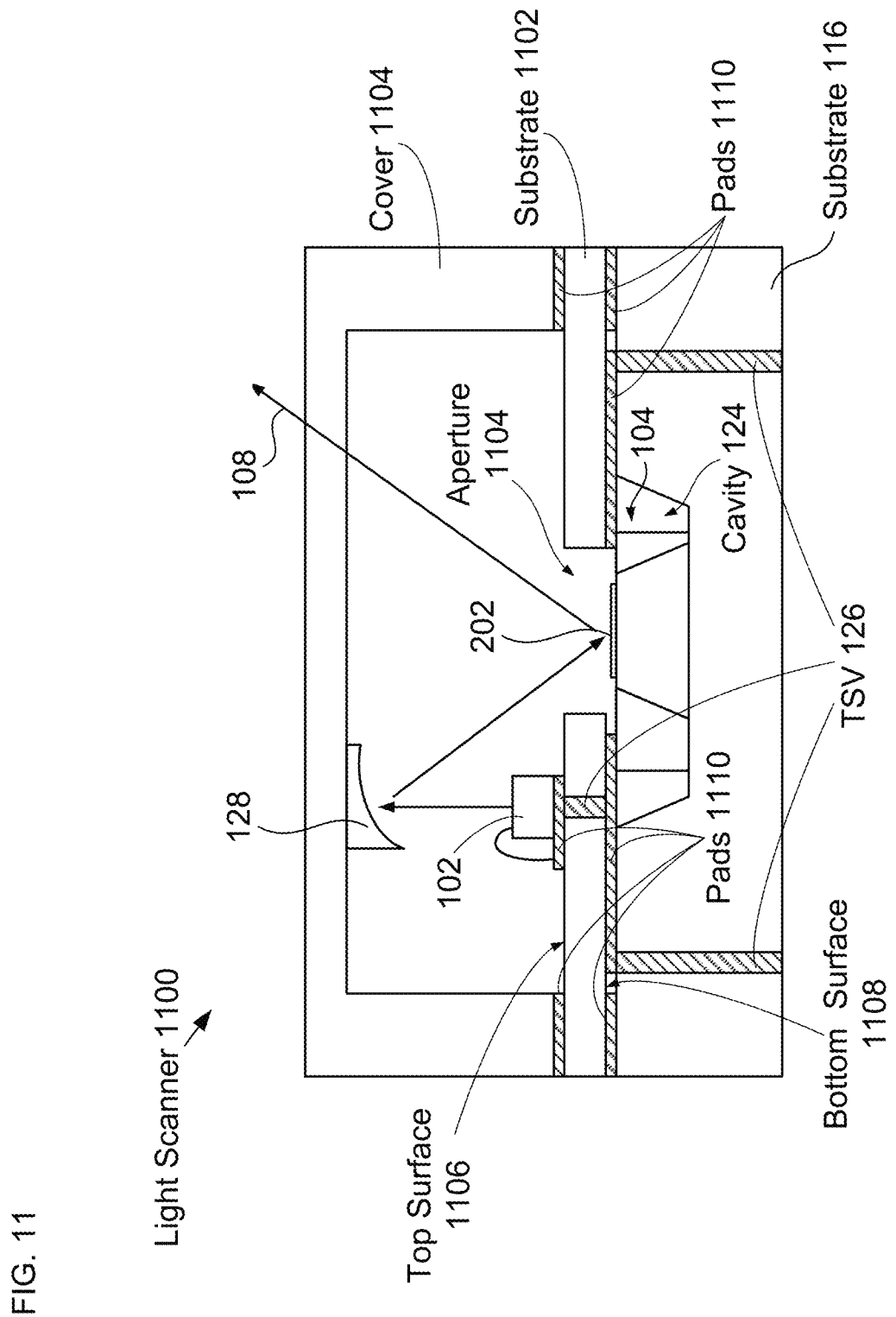
FIG. 11 depicts a schematic drawing of another alternative light scanner in accordance with the present disclosure.

FIG. 11 depicts a schematic drawing of another alternative light scanner in accordance with the present disclosure. Light scanner 1100 is analogous to light scanner 300; however, light scanner 1100 includes an intermediate substrate on which both light source 102 and MEMS scanner 104 are bonded such that the light source and MEMS scanner are optically coupled through the intermediate substrate.

Intermediate substrate 1102 comprises aperture 1104, which extends completely through the substrate from top surface 1106 to bottom surface 1108. Intermediate substrate 1102 also includes an arrangement of bond pads (not shown) on each of its top and bottom surfaces for making electrical contact to the light source and MEMS scanner, respectively. In some embodiments, intermediate substrate 1102 comprises a material that is transparent for light signal 108 and, therefore, does not require aperture 1104. However, in such embodiments, intermediate substrate 1102 preferably includes a cavity that allows the desired range of motion of optical element 202.

Light scanner 1100 advantageously employs intermediate substrate 1102 as a platen common to all elements in the optical path. Furthermore, both light source 102 and MEMS scanner 104 can be flip-chip bonded to intermediate substrate 1102 using conventional pick-and-place equipment, thereby enabling low-cost high-precision assembly of the light scanner. Furthermore, since substrate 116 does not affect the accuracy of component placement, it can be made using low-cost fabrication techniques. In addition, the arrangement of light scanner 1100 eases package assembly because only the dimensional and alignment tolerances of the top cover have significant impact on optical performance.

In the depicted example, MEMS scanner 104 is bonded to pads 1110 located on bottom surface 1108 of substrate 1102 using standard flip-chip bonding. In similar fashion, light source 102 is joined to pads 1110 located on top surface 1106 using a flip-chip bond for its substrate and a single wire bond for its top contact. As noted above, any conventional bonding technique can be used to physically join and/or electrically couple components of a light scanner in accordance with the present disclosure. It should be noted that the use of flip-chip bonding enables a wire-bond-free package, as well as reducing the number of epoxy steps required. Furthermore, since TSV are not required in MEMS substrate 110, fabrication of MEMS scanner 104 is also simplified.

In some embodiments, light source 102 includes two backside contacts and is joined to substrate 1102 via conventional bonding techniques, thereby entirely avoiding the use of wire bonds in light scanner 1100.

Figure 12:
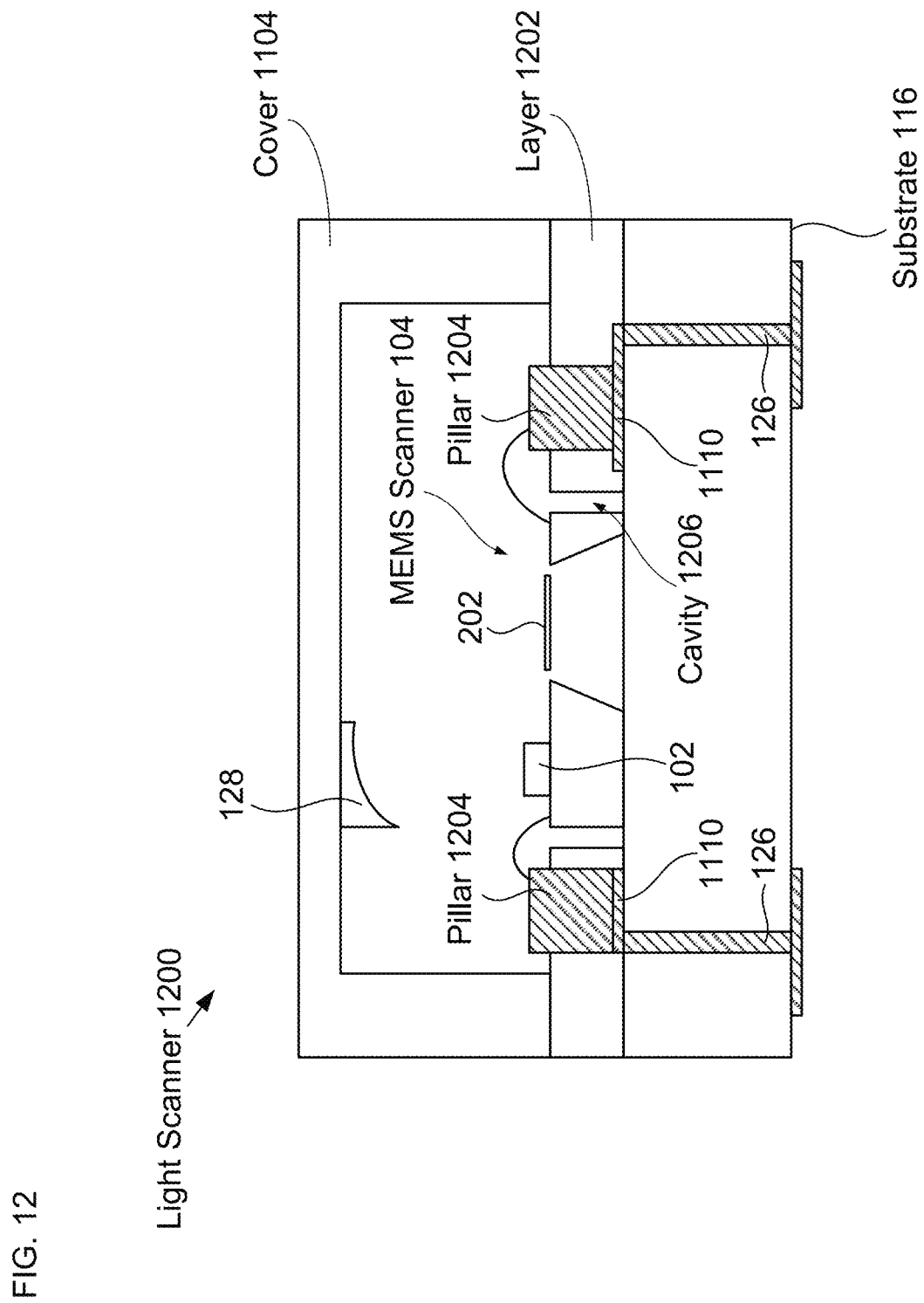
FIG. 12 depicts a schematic drawing of yet another alternative light scanner in accordance with the present disclosure.

FIG. 12 depict a schematic drawing of yet another alternative light scanner in accordance with the present disclosure. Light scanner 1200 is analogous to light scanner 300; however, light scanner 1200 includes an electrically insulating layer that acts as an interface between substrate 116 and cover 120, as well as conductive pillars that extend through the thickness of the insulating layer to enable electrical connection to light source 102 and MEMS scanner 104.

Insulating layer 1202 is a polymer layer applied to substrate 116 via a conventional process, such as spin coating, vapor deposition, and the like. Typically, insulating layer 1202 is applied to substrate 116 after the formation of pillars 1204. In the depicted example, insulating layer 1202 is a layer of SU-8 that is spun onto the top surface of substrate 116 and then patterned using conventional lithographic techniques to define cavity 1206. In some embodiments, insulating layer 1202 comprises a different photodefinable polymer, such as photosensitive benzocyclobutene (BCB), photoresist, and the like. In some embodiments, insulating layer 1202 comprises a different polymer that is patterned using conventional etching techniques. In some embodiments, insulating layer 1202 comprises a material other than a polymer.

It should be noted that the use of a photodefinable polymer for insulating layer 1202 simplifies fabrication of light scanner 1200 and can also enable wafer-scale fabrication with high precision.

Pillars 1204 are columnar structures of conductive material that extend above the total thickness of insulating layer 1202. Pillars 1204 are analogous to TSV 126. In the depicted example, pillars 1204 comprise copper and are formed via electroplating before the formation of insulating layer 1202. In some embodiments, pillars 1204 are formed via a different fabrication method, such as electroless plating, direct die bonding of preformed pillars, etc. In some embodiments, pillars 1204 comprise a conductive material other than copper.

In the depicted example, light source 102 is disposed on MEMS substrate 110 and pillars 1204 are electrically connected to light source 102 and MEMS scanner 104 using conventional wire bonding; however, other configurations of components and/or electrical interconnection technology can be used without departing from the scope of the present disclosure.

It is to be understood that the disclosure teaches just some examples of embodiments in accordance with the present invention and that many variations of the invention can easily be devised by those skilled in the art after reading this disclosure and that the scope of the present invention is to be determined by the following claims.

What is claimed is:

1. A light scanner for steering a light signal in at least one dimension, the light scanner comprising:
   a light source configured to provide a first light signal;
   a first optical element configured to direct a second light signal to a scanning element, wherein the second light signal includes at least a portion of the first light signal;
   a MEMS scanner operative for steering the second light signal in at least one dimension, the MEMS scanner comprising the scanning element and a first thermal actuator configured to rotate the scanning element about a first axis; and
   a housing that includes:
   (i) a first substrate; and
   (ii) a cover comprising a first material that is substantially transparent for the second light signal, wherein the cover includes the first optical element;
   wherein the housing encloses a sealed chamber that contains the light source and the MEMS scanner; and
   wherein the light source, MEMS scanner, and cover are arranged such that the scanner is operative for directing the second light signal through the cover.

2. The light scanner of claim 1 wherein the MEMS scanner is operative for steering the second light signal in two dimensions, the MEMS scanner further comprising a second thermal actuator configured to rotate the scanning element about a second axis.

3. The light scanner of claim 1 wherein the first optical element is selected from the group consisting of a reflector, a diffractive optical element (DOE), a prism, a metalens, a metasurface, and an off-axis parabolic mirror.

4. The light scanner of claim 1 wherein the cover has an inner surface and an outer surface, and wherein the first optical element is located on the inner surface.

5. The light scanner of claim 1 wherein the cover has an inner surface and an outer surface, and wherein the first optical element is located on the outer surface.

6. The light scanner of claim 1 wherein the first thermal actuator is an isothermal actuator.

7. The light scanner of claim 1 wherein the cover is non-planar.

8. The light scanner of claim 7 wherein the cover includes a first region that has a first surface having a uniform radius of curvature, and wherein the first optical element includes a reflector disposed on the first surface such that the first optical element at least partially collimates the second light signal.

9. The light scanner of claim 7 wherein the MEMS scanner is configured to direct the first light signal along an optical axis when the MEMS scanner is in its quiescent state, and wherein the cover has a first surface that is normal to the optical axis.

10. The light scanner of claim 9 wherein the cover has a second surface that is not normal to the optical axis.

11. The light scanner of claim 1 wherein the cover has an inner surface and an outer surface, and wherein at least one of the inner surface and the outer surface comprises a metasurface that is configured to change a propagation direction of the second light signal as the second light signal transits the metasurface.

12. The light scanner of claim 1 wherein the MEMS scanner comprises a MEMS substrate and the scanning element and first actuator are disposed on a first surface of the MEMS substrate, and wherein the MEMS scanner is disposed on the first substrate such that the first surface is proximal to the first substrate.

13. The light scanner of claim 1 wherein the first substrate includes a cavity, and wherein the MEMS scanner comprises a MEMS substrate and the scanning element and first actuator are disposed on a first surface of the MEMS substrate, and further wherein the MEMS scanner is disposed on the first substrate such that the first surface is proximal to the first substrate and the scanning element is located over the cavity.

14. The light scanner of claim 13 wherein the first substrate includes a first contact pad located inside the sealed chamber, the first contact pad being electrically coupled with a second contact pad located outside of the sealed chamber, and wherein the first actuator is electrically coupled with the first contact pad.

15. The light scanner of claim 13 further comprising a bridging substrate, wherein the first actuator is electrically coupled with the first contact pad via the bridging substrate.

16. The light scanner of claim 15 wherein the light source is disposed on the bridging substrate, and wherein the light source is electrically coupled with a third contact pad located outside of the sealed chamber via the bridging substrate.

17. The light scanner of claim 1 wherein the light source is disposed on the first substrate.

18. The light scanner of claim 17 wherein the first substrate includes a cavity, and wherein the light source is disposed within the cavity.

19. The light scanner of claim 1 wherein the first substrate includes a first surface, a second surface that is distal to the first surface, and a first substrate portion that is substantially transparent for the second light signal, and wherein the MEMS scanner is disposed on the first surface and the light source is disposed on the second surface, and further wherein the MEMS scanner and the first optical element are arranged such that the second light signal passes through the first substrate.

20. The light scanner of claim 1 further comprising a second light source and a detector, wherein the MEMS scanner includes a MEMS substrate comprising a cavity, and wherein the second light source provides a third light signal that is reflected by the scanning element to the detector.

21. The light scanner of claim 20 wherein the second light source and detector are located within the cavity.

22. The light scanner of claim 1 wherein the housing includes a spacer that is located between the cover and the first substrate.

23. The light scanner of claim 22 wherein the spacer is disposed on the first substrate and includes a first cavity, and wherein the MEMS scanner is disposed on the first substrate such that it is located in the first cavity.

24. The light scanner of claim 1 wherein the first element includes a reflective Fresnel lens that has a focal point, and wherein the first element receives the first light signal from the light source, and further wherein the first element and light source are arranged such that the light source is displaced from the focal point by a first distance that is a non-zero distance.

25. A light scanner for steering a light signal in at least one dimension, the light scanner comprising:
   a housing comprising a cover that is substantially transparent for a light signal;
   a first optical element configured to receive the light signal and provide it to a MEMS scanner that directs the light signal through the cover;
   the MEMS scanner, the MEMS scanner comprising a scanning element and a first thermal actuator configured to rotate the scanning element about a first axis;
   wherein the housing encloses a sealed chamber that contains the MEMS scanner.

26. The light scanner of claim 25 wherein the first optical element is selected from the group consisting of a reflector, a diffractive optical element (DOE), a prism, a metalens, a metasurface, and an off-axis parabolic mirror.

27. The light scanner of claim 25 further comprising a light source configured to provide the first light signal to the first optical element.

28. The light scanner of claim 25 wherein the cover is non-planar.

29. The light scanner of claim 28 wherein the cover has a dome shape.

30. The light scanner of claim 28 wherein the cover includes a first region that has a first surface having a uniform radius of curvature, and wherein the first optical element includes a reflector disposed on the first surface such that the first optical element at least partially collimates the second light signal.

31. The light scanner of claim 28 wherein the MEMS scanner is configured to direct the first light signal along an optical axis when the MEMS scanner is in its quiescent state, and wherein the cover has a first surface that is normal to the optical axis.

32. The light scanner of claim 31 wherein the cover has a second surface that is not normal to the optical axis.

33. The light scanner of claim 25 wherein the cover has an inner surface and an outer surface, and wherein the outer surface comprises a metasurface that is configured to change a propagation direction of the second light signal as the second light signal transits the metasurface.

34. The light scanner of claim 25 wherein the cover has an inner surface and an outer surface, and wherein the first optical element is located on the outer surface.

35. The light scanner of claim 25 wherein the first thermal actuator is an isothermal actuator.

* * * * *